(12) United States Patent
Zapfe

(10) Patent No.: US 12,107,531 B2
(45) Date of Patent: Oct. 1, 2024

(54) LONGITUDINAL PROFILE AND MODULE CLAMP FOR A MOUNTING SYSTEM FOR SOLAR MODULES, AND A MOUNTING SYSTEM OF SUCH A TYPE

(71) Applicant: SCHLETTER INTERNATIONAL B.V., Amsterdam (NL)

(72) Inventor: Cedrik Zapfe, Grafing (DE)

(73) Assignee: SCHLETTER INTERNATIONAL B.V. (NL)

( * ) Notice: Subject to any disclaimer, the term of this patent is extended or adjusted under 35 U.S.C. 154(b) by 289 days.

(21) Appl. No.: 17/610,832

(22) PCT Filed: May 6, 2020

(86) PCT No.: PCT/EP2020/062508
§ 371 (c)(1),
(2) Date: Nov. 12, 2021

(87) PCT Pub. No.: WO2020/229244
PCT Pub. Date: Nov. 19, 2020

(65) Prior Publication Data
US 2022/0216824 A1   Jul. 7, 2022

(30) Foreign Application Priority Data
May 13, 2019 (DE) .......................... 102019003390.6

(51) Int. Cl.
*H02S 20/23* (2014.01)
*F16B 2/02* (2006.01)
(Continued)

(52) U.S. Cl.
CPC ................ *H02S 30/10* (2014.12); *F16B 2/02* (2013.01); *F16M 11/22* (2013.01); *F16M 13/02* (2013.01)

(58) Field of Classification Search
CPC .... H02S 20/10; F16B 2/02; F16B 2/04; F16B 2/06; F24S 25/12; F24S 25/63;
(Continued)

(56) References Cited

U.S. PATENT DOCUMENTS 749,440 A * 1/1904 Jackson .................... E04B 5/46
52/289
1,214,928 A * 2/1917 Lachman ................ E04C 2/423
52/844
(Continued)

FOREIGN PATENT DOCUMENTS

CN         107482998 A    12/2017
DE      202010006443 U1    8/2010
(Continued)

OTHER PUBLICATIONS

Japanese Office Action 2021-568478 Issued Dec. 16, 2022.
(Continued)

*Primary Examiner* — Kyle J. Walraed-Sullivan
(74) *Attorney, Agent, or Firm* — The Belles Group, P.C.

(57) ABSTRACT

The present invention relates to a longitudinal profile for a mounting system for solar modules, comprising: at least one stop area which is designed to fasten the longitudinal profile to a transverse profile, wherein the at least one stop area has at least one support surface for support on the transverse profile, at least one head area which is connected to the at least one stop area via at least one connecting portion, wherein the at least one head area has at least one bearing surface for at least one portion of a module frame of the solar module, wherein the at least one head area has at least one engagement projection which is configured as a point of engagement for a fastening device. The present invention further relates to a mounting system comprising such a longitudinal profile.

20 Claims, 24 Drawing Sheets

Figure 1:
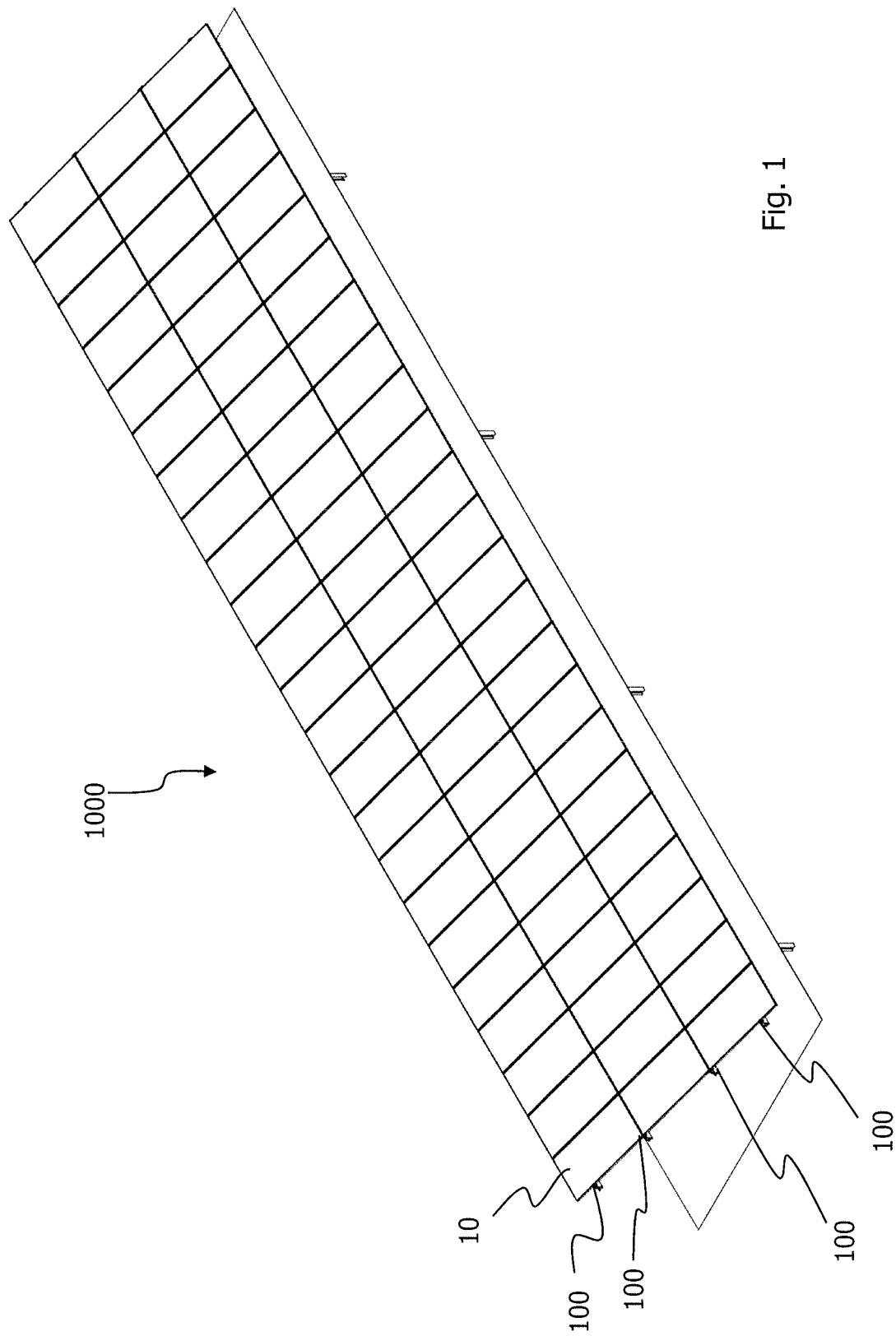

(51) Int. Cl.
  *F16M 11/22* (2006.01)
  *F16M 13/02* (2006.01)
  *H02S 30/10* (2014.01)
(58) Field of Classification Search
  CPC ........ F24S 25/632; F24S 25/634; F24S 25/65;
           F24S 25/67; F24S 25/70; F24S
           2025/6003; F24S 2025/804; F24S
           2025/801; Y02E 10/47
  See application file for complete search history.

(56) References Cited

U.S. PATENT DOCUMENTS

| | | | | |
|---|---|---|---|---|
| 4,621,472 | A * | 11/1986 | Kloke | E04D 3/08 52/204.591 |
| 6,065,255 | A * | 5/2000 | Stern | F24S 25/33 52/173.3 |
| 8,505,864 | B1 * | 8/2013 | Taylor | H02S 20/23 52/173.3 |
| 10,203,000 | B2 * | 2/2019 | Nehls | F16M 13/027 |
| 2008/0053517 | A1 | 3/2008 | Plaisted | F24S 25/20 136/251 |
| 2008/0169018 | A1 * | 7/2008 | Miyamoto | F24S 25/632 136/251 |
| 2008/0310913 | A1 * | 12/2008 | Urban | F24S 25/61 403/404 |
| 2010/0132274 | A1 * | 6/2010 | Reyal | F24S 40/44 52/173.3 |
| 2011/0023390 | A1 * | 2/2011 | Kneip | F24S 25/61 52/173.3 |
| 2011/0068244 | A1 * | 3/2011 | Hartelius | F24S 25/634 174/138 R |
| 2011/0272367 | A1 | 11/2011 | Kufner | |
| 2012/0017526 | A1 * | 1/2012 | Eide | E04D 13/031 52/173.3 |
| 2012/0031862 | A1 * | 2/2012 | Belikoff | F24S 25/33 211/41.17 |
| 2012/0132262 | A1 * | 5/2012 | Sagayama | H02S 20/10 136/251 |
| 2012/0273031 | A1 * | 11/2012 | Sagayama | F24S 25/13 136/251 |
| 2012/0312356 | A1 * | 12/2012 | Mizuo | H02S 20/23 136/251 |
| 2013/0008103 | A1 * | 1/2013 | Sagayama | H02S 20/10 211/183 |
| 2013/0011187 | A1 * | 1/2013 | Schuit | H02S 40/34 403/287 |
| 2013/0082014 | A1 | 4/2013 | Nitzko et al. | |
| 2013/0098858 | A1 * | 4/2013 | Cusson | F24S 25/65 211/189 |
| 2013/0125959 | A1 * | 5/2013 | Sagayama | F24S 25/12 136/251 |
| 2013/0139869 | A1 * | 6/2013 | Nuernberger | H02S 20/24 136/251 |
| 2013/0139870 | A1 * | 6/2013 | Nuernberger | F24S 25/634 136/251 |
| 2013/0141845 | A1 * | 6/2013 | Nuernberger | H02S 20/10 361/679.01 |
| 2015/0013754 | A1 * | 1/2015 | Yakushiji | F16M 13/02 136/251 |
| 2015/0247326 | A1 * | 9/2015 | Haddock | E04F 13/0842 52/705 |
| 2015/0311606 | A1 * | 10/2015 | Meine | H01R 9/18 439/100 |
| 2015/0311854 | A1 * | 10/2015 | Goehringer | H02S 20/00 29/525.08 |
| 2016/0164455 | A1 | 6/2016 | Kanbara et al. | |
| 2017/0117842 | A1 * | 4/2017 | Grant | F24S 25/617 |
| 2017/0133976 | A1 * | 5/2017 | Dickey | H02S 20/23 |
| 2018/0123505 | A1 * | 5/2018 | Prat | F24S 25/33 |
| 2018/0187411 | A1 * | 7/2018 | Shang | F16B 37/045 |
| 2019/0131918 | A1 * | 5/2019 | Kobayashi | F16B 2/12 |
| 2019/0178274 | A1 * | 6/2019 | Katz | H02S 20/20 |
| 2019/0372507 | A1 * | 12/2019 | Kobayashi | F16B 5/0628 |
| 2020/0059195 | A1 * | 2/2020 | Wang | H02S 20/20 |
| 2020/0169214 | A1 * | 5/2020 | Koch | F24S 25/63 |
| 2021/0041144 | A1 * | 2/2021 | Eriksson | F24S 25/37 |
| 2021/0067083 | A1 * | 3/2021 | Stephan | F24S 25/634 |
| 2021/0194409 | A1 * | 6/2021 | Gruetzner | F24S 25/70 |
| 2022/0255496 | A1 * | 8/2022 | Carroll | H02S 30/10 |
| 2022/0345074 | A1 * | 10/2022 | Neal | H02S 30/10 |
| 2022/0407451 | A1 * | 12/2022 | Jacobs | H02S 30/00 |
| 2023/0178904 | A1 * | 6/2023 | Stephan | H02S 20/23 439/115 |

FOREIGN PATENT DOCUMENTS

| | | | | |
|---|---|---|---|---|
| DE | 202012012290 U1 | 1/2013 | | |
| DE | 202016008379 U1 | 9/2017 | | |
| DE | 102018114621 A1 * | 12/2019 | ............. | F24S 25/12 |
| EP | 2302694 A1 | 3/2011 | | |
| JP | 2013239495 A | 11/2013 | | |
| JP | 2014195056 A | 10/2014 | | |
| JP | 2015038316 A | 2/2015 | | |
| JP | 2015105494 A | 6/2015 | | |
| JP | 2016105680 A | 6/2016 | | |
| WO | 2013162009 A1 | 10/2013 | | |
| WO | 2017013241 A1 | 1/2017 | | |

OTHER PUBLICATIONS

Office Action issued in counterpart Chinese Application No. 202080035788.3 on Nov. 16, 2023.
Office Action issued in corresponding Chinese Application No. 202080035788.3 on Apr. 26, 2024.

* cited by examiner

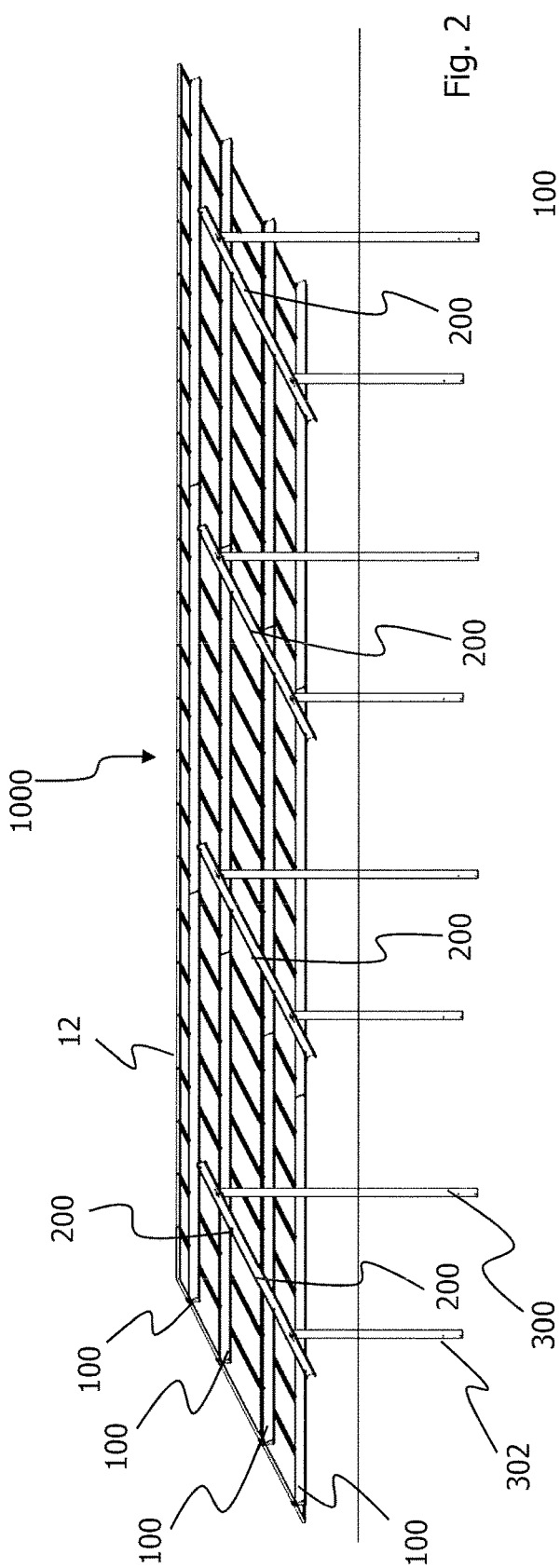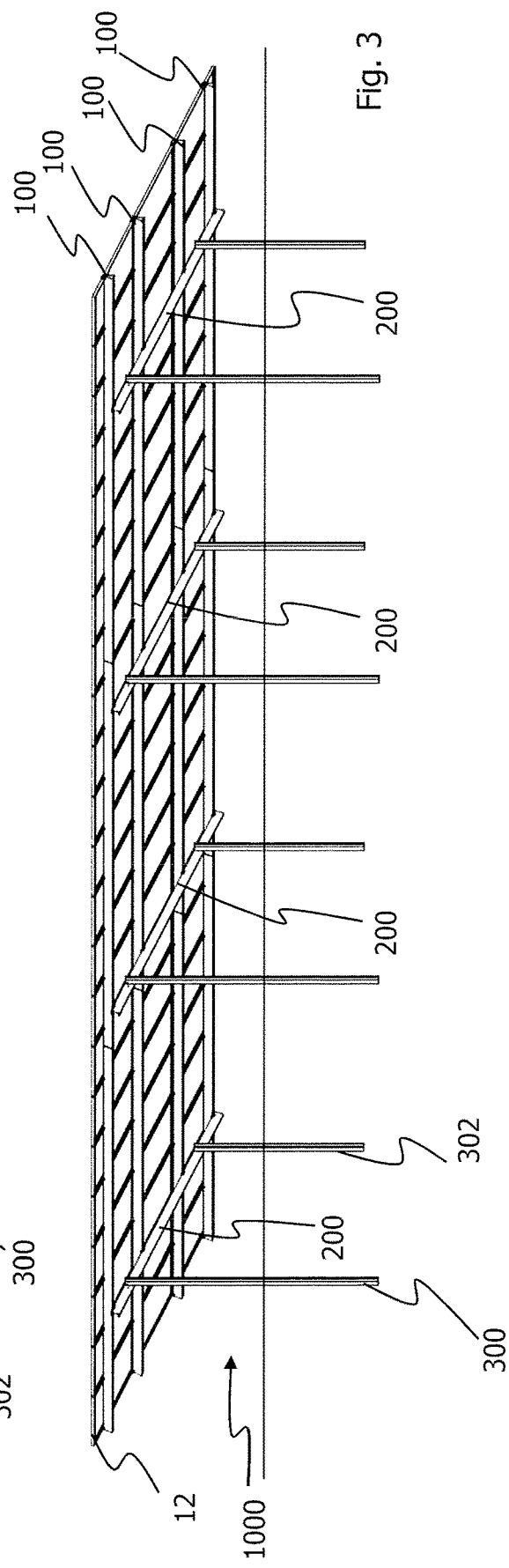

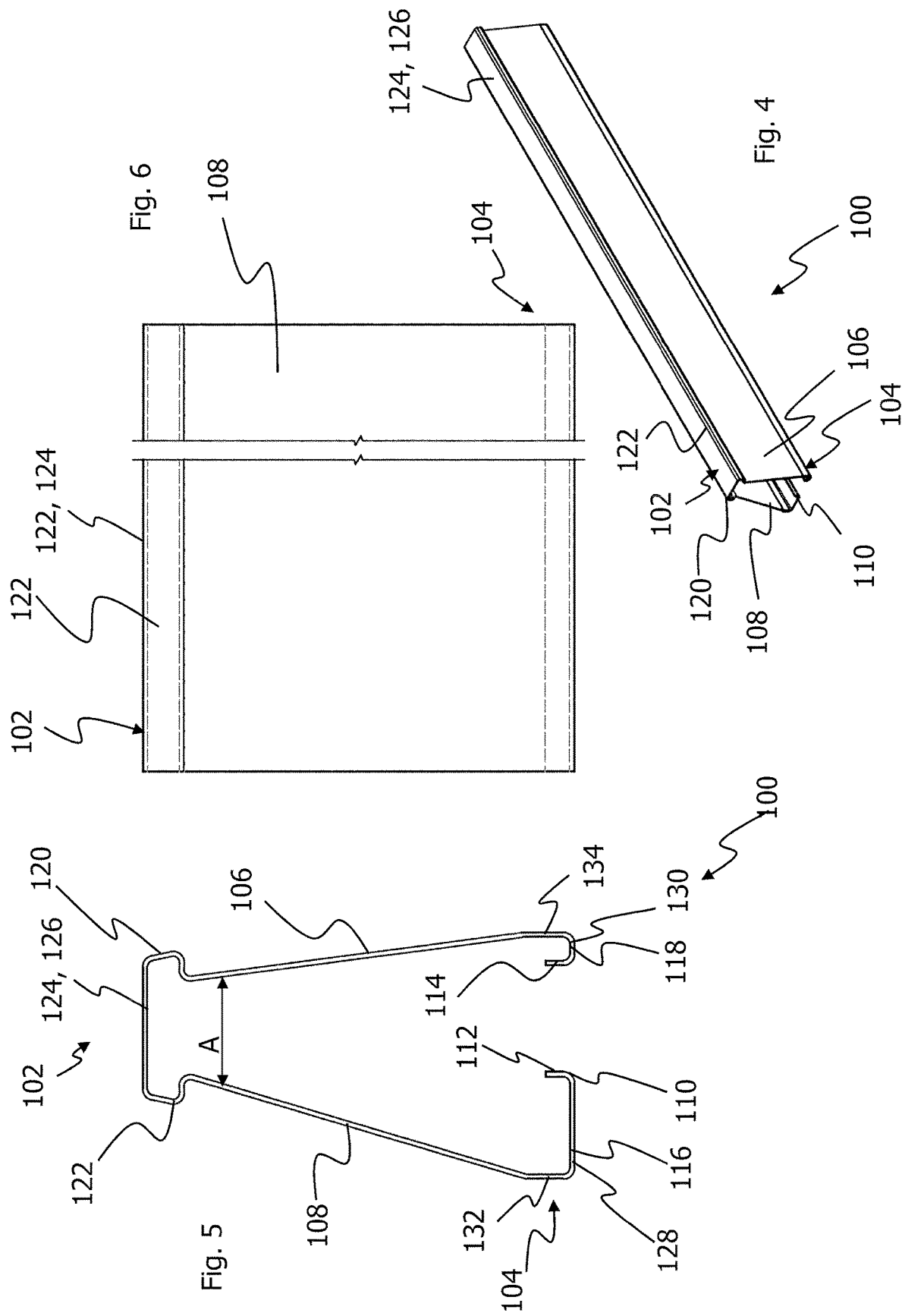

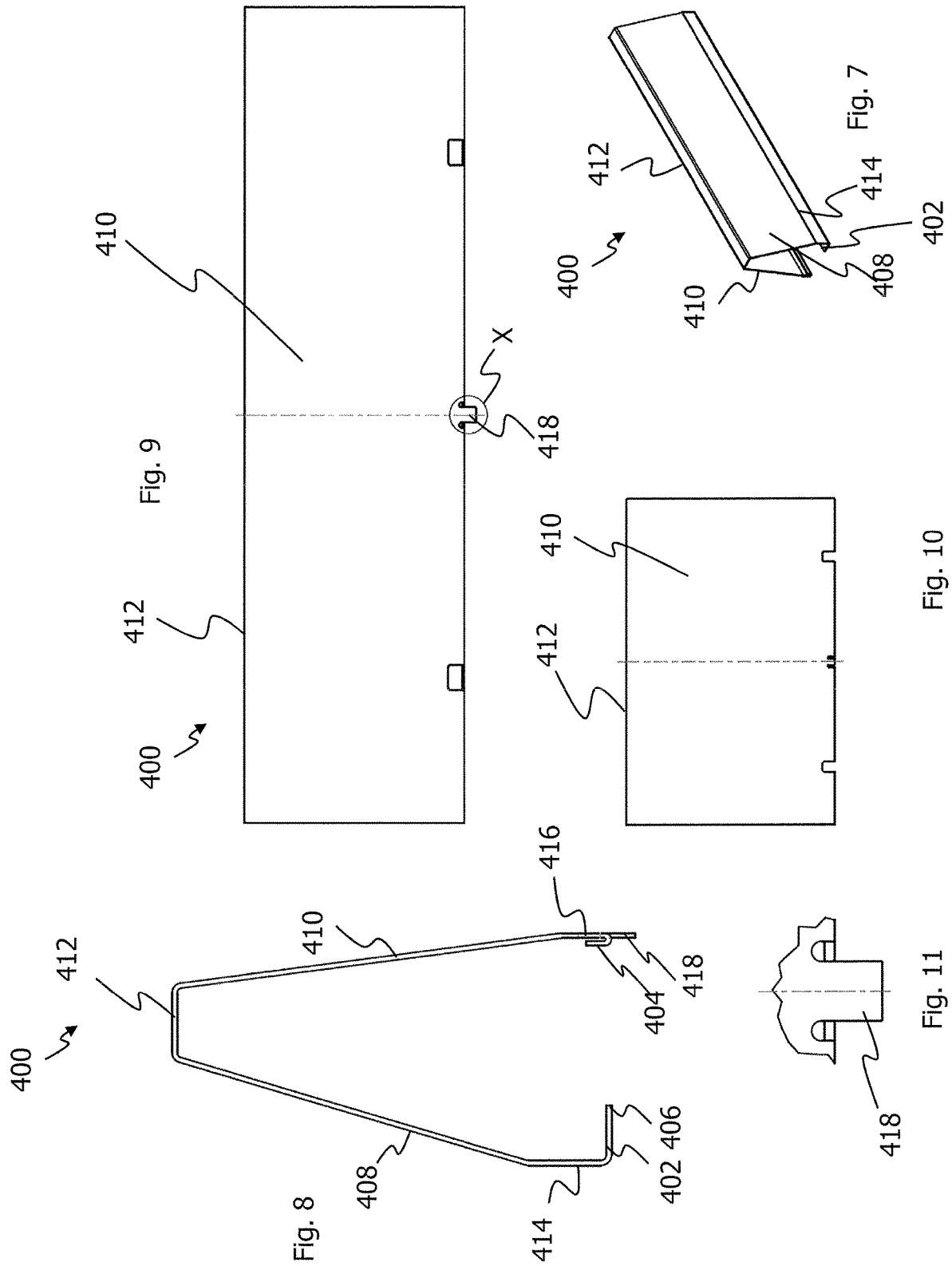

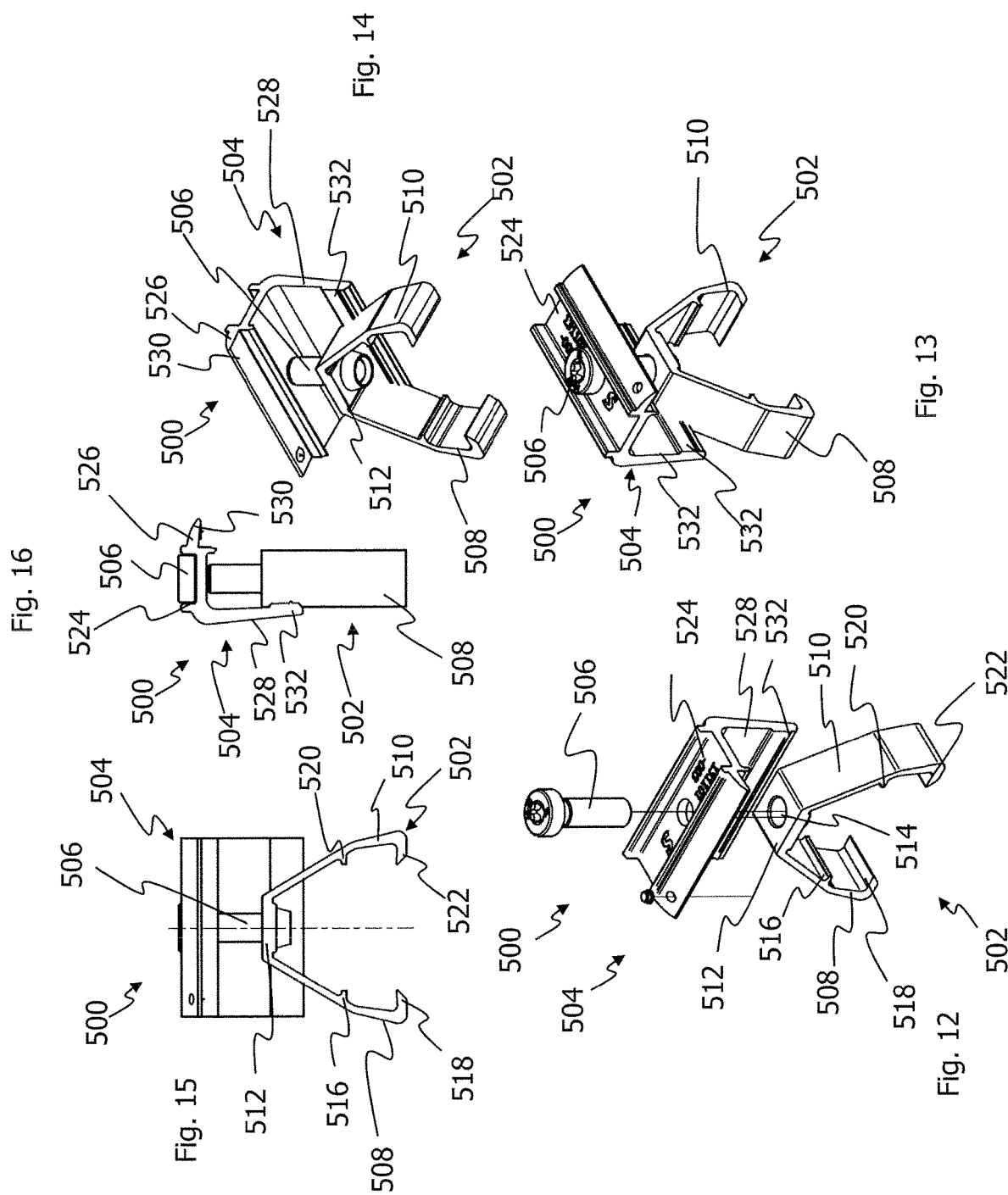

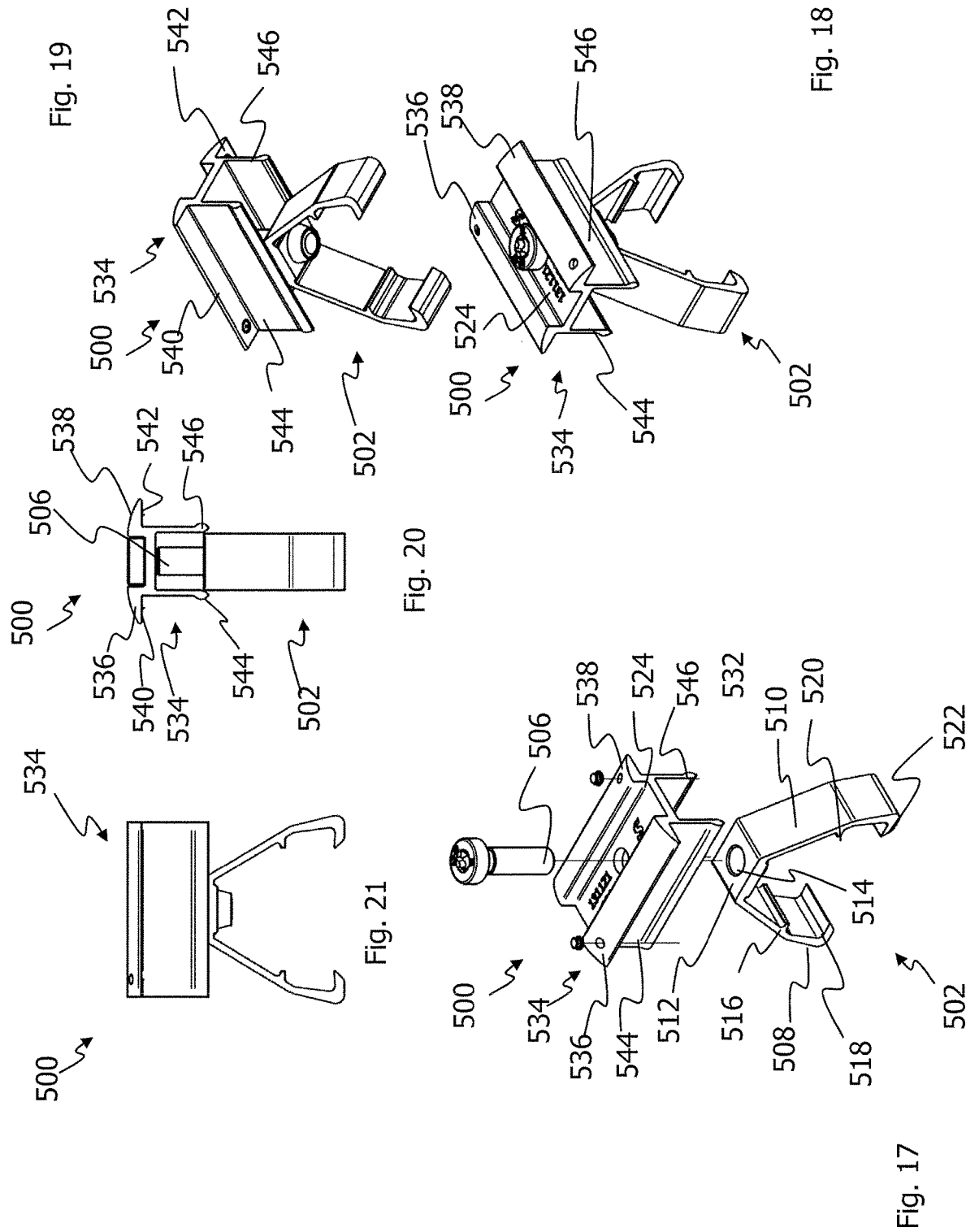

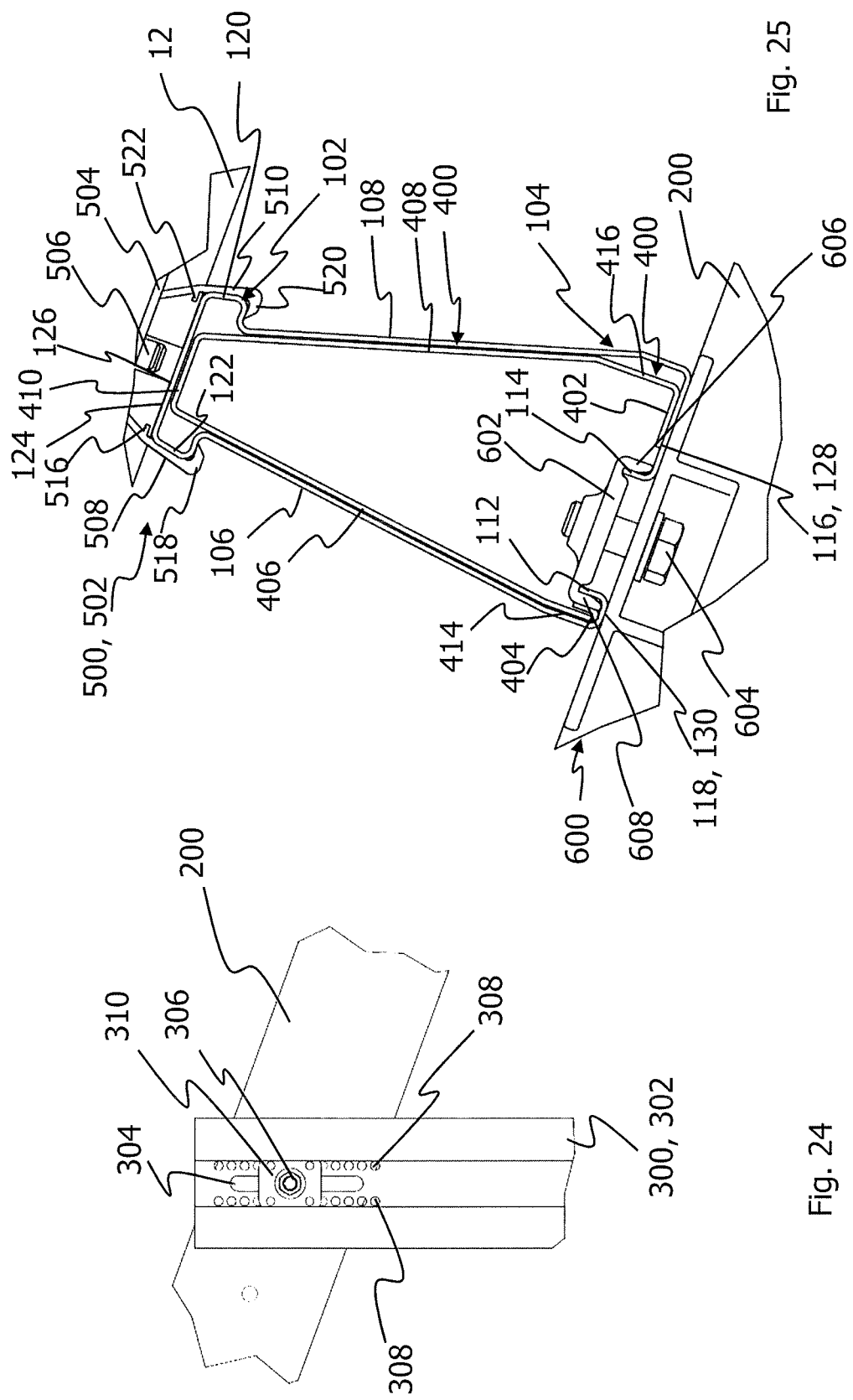

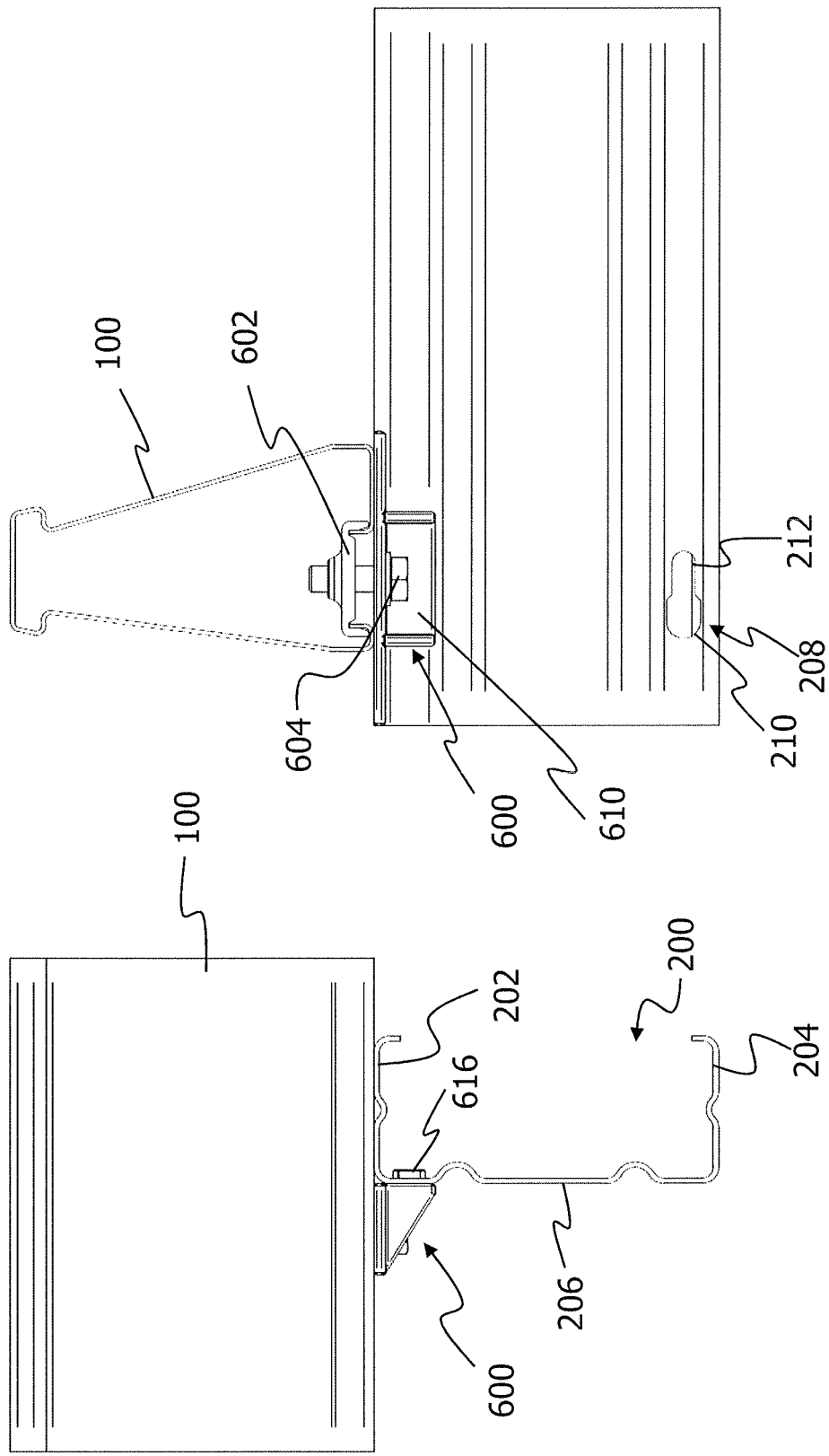

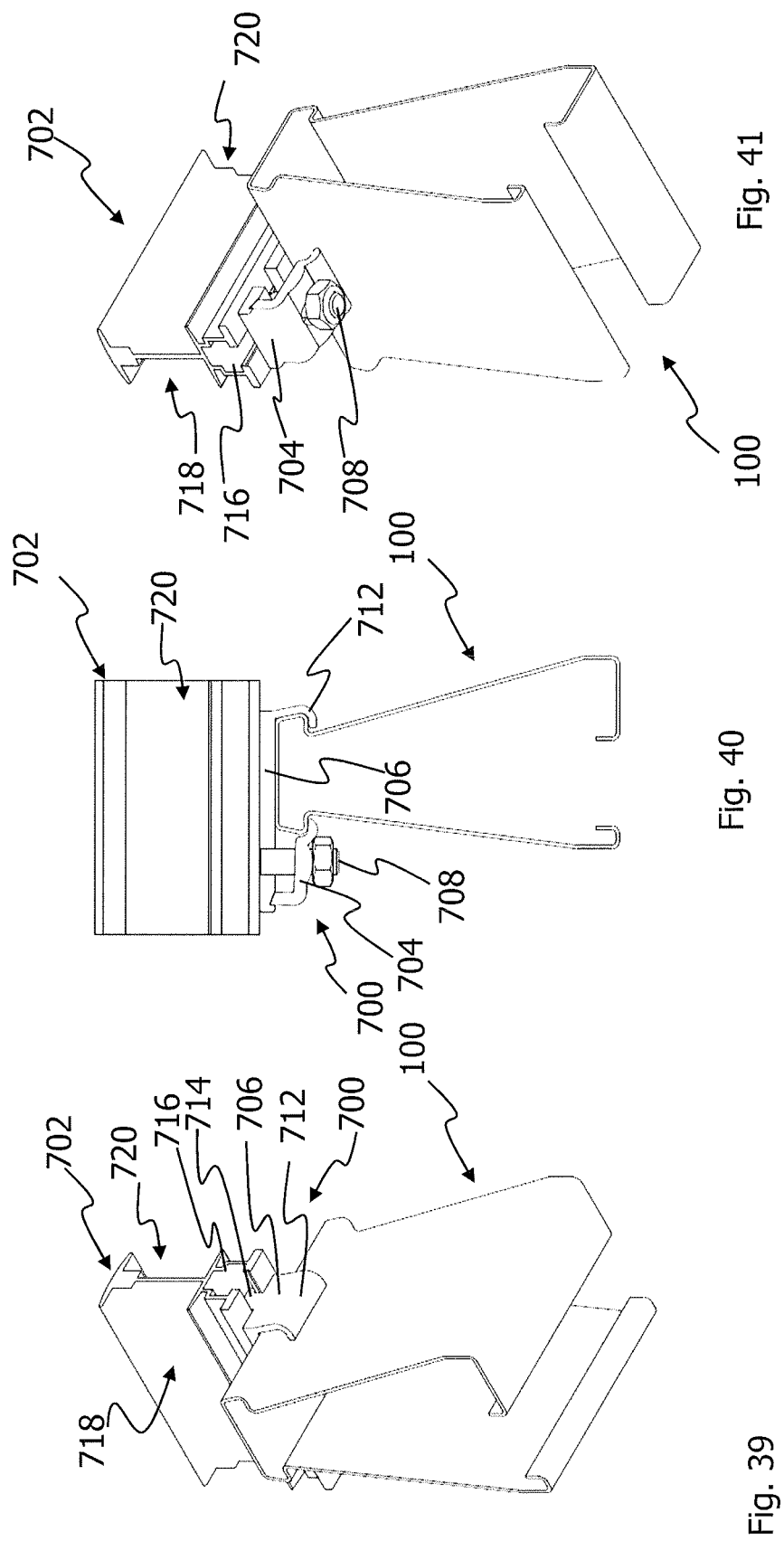

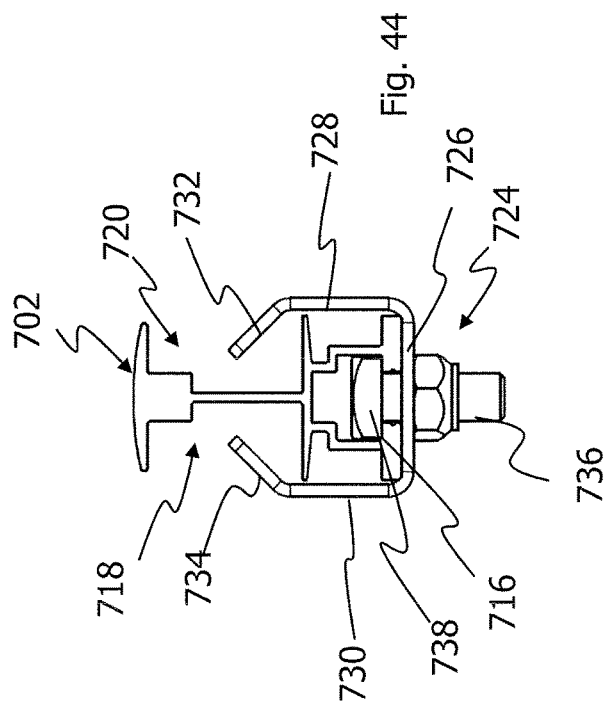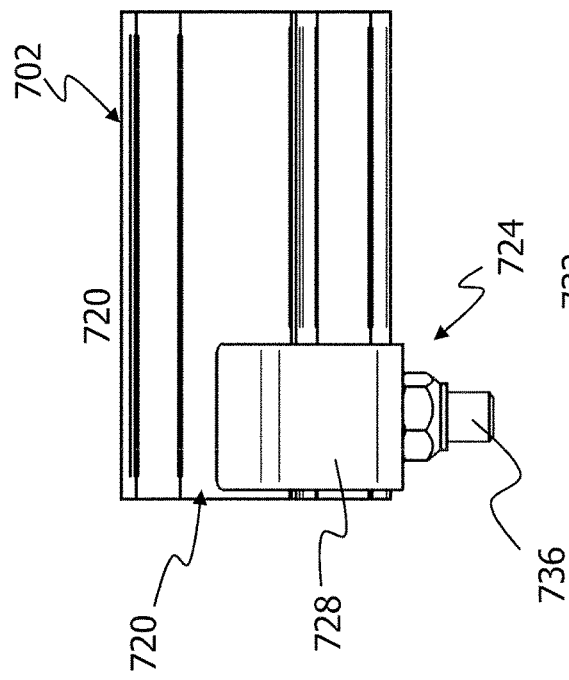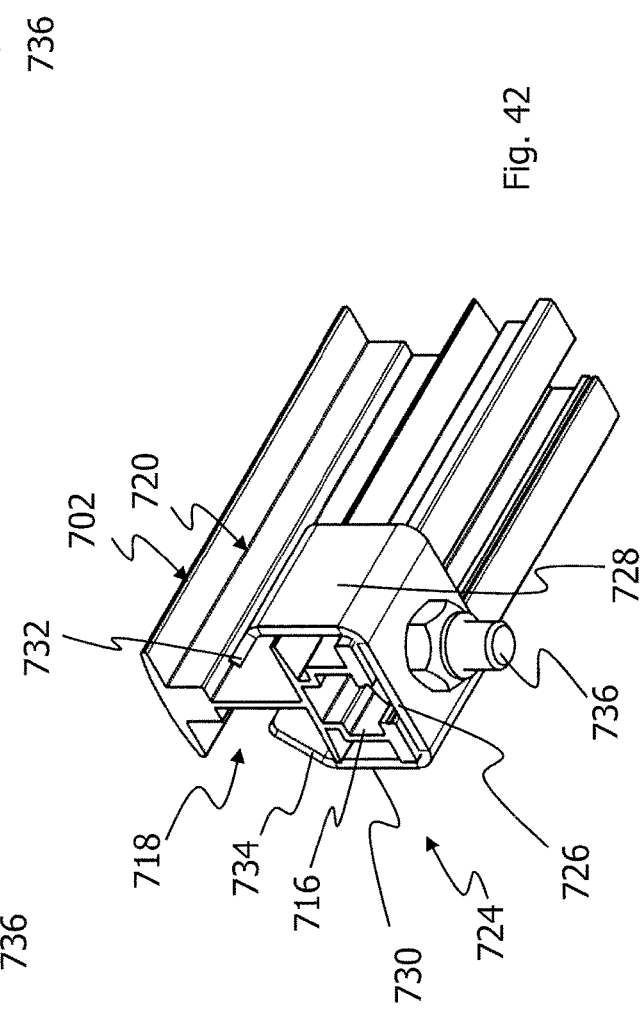

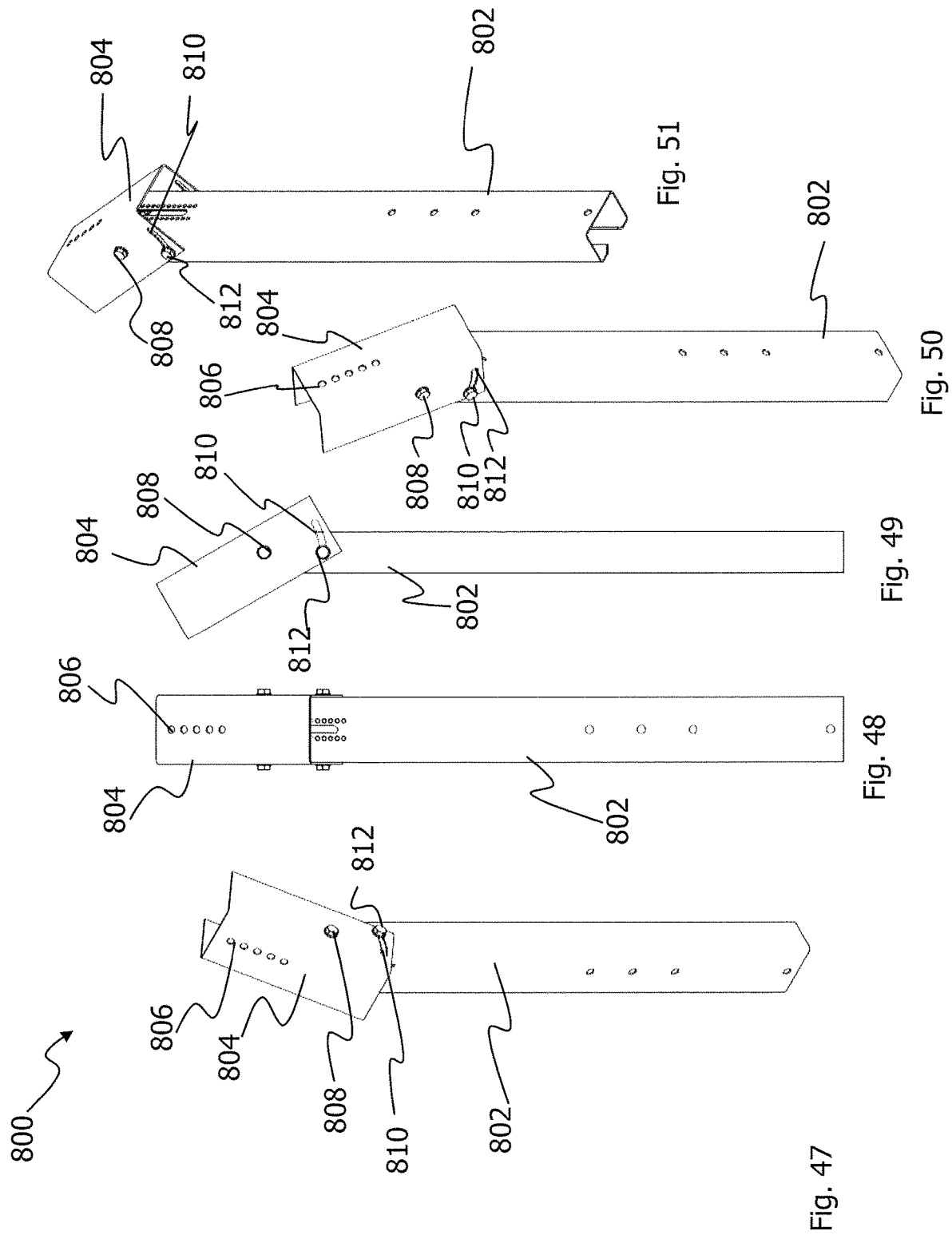

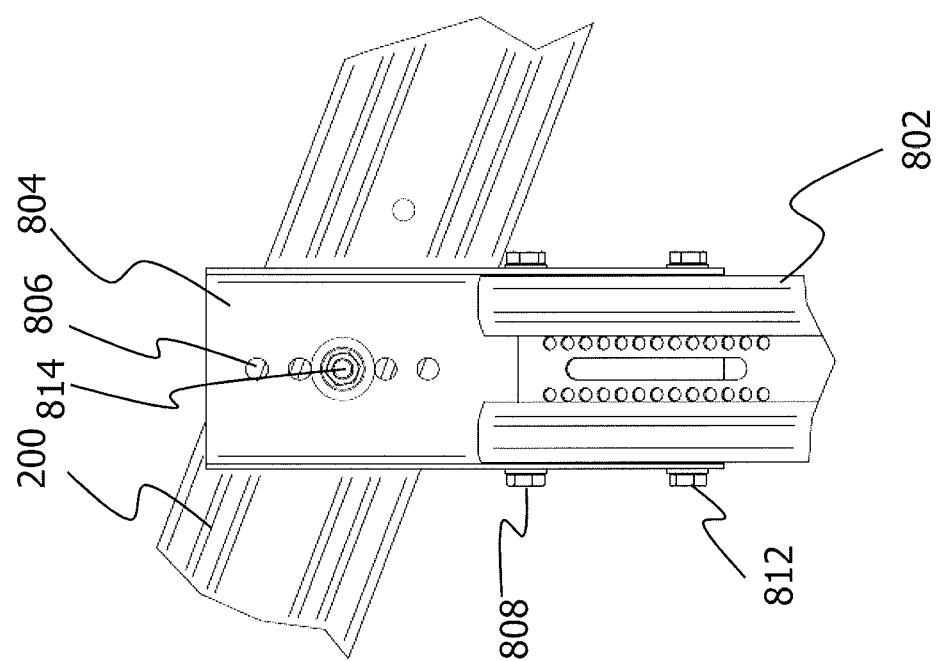

LONGITUDINAL PROFILE AND MODULE CLAMP FOR A MOUNTING SYSTEM FOR SOLAR MODULES, AND A MOUNTING SYSTEM OF SUCH A TYPE

CROSS REFERENCE TO RELATED PATENT APPLICATIONS

The present application is a U.S. national stage application under 35 U.S.C. § 371 of PCT Application No. PCT/EP2020/062508, filed May 6, 2020, which claims priority to German Patent Application No. 102019003390.6, filed May 13, 2019. The disclosures of the aforementioned priority applications are incorporated herein by reference in their entireties.

The present invention relates to a longitudinal profile and a module clamp for a solar module mounting system. The present invention further relates to a solar module mounting system. Such a mounting system may in particular be designed for use in open land. Such mounting systems are often referred to as open land mounting systems.

It is an object of the present invention to provide a longitudinal profile for a solar module mounting system that is inexpensive to manufacture and yet has high strength values. It is another object of the present invention to provide a module clamp for fastening solar modules to a longitudinal profile via their module frame. In addition, it is an object of the present invention to provide a solar module mounting system that is inexpensive to manufacture and capable of withstanding high loads.

These objects are achieved with a longitudinal profile with the features of claim 1, a module clamp with the features of claim 10 and a mounting system with the features of claim 17.

Further advantageous embodiments are specified in the dependent claims.

The longitudinal profile for a solar module mounting system according to the invention comprises at least one stop area which is designed to fasten the longitudinal profile to a transverse profile, and at least one head area which is connected to the at least one stop area via at least one connecting portion. The at least one stop area has at least one support surface for support on the transverse profile. The at least one head area has at least one bearing surface for at least one portion of a module frame of the solar module. The at least one head area has at least one engagement projection which is configured as a point of engagement for a fastening device.

The at least one head area may be formed by at least one undercut. The at least one head area may have at least two engagement projections pointing in opposite directions, which are configured as points of engagement for a fastening device for fastening a module frame to the longitudinal profile. Such a fastening device may be a module clamp, for example. The at least one head area may have at least one bearing portion which connects the at least two engagement projections. The at least one bearing portion may have the at least one bearing surface. The at least one bearing surface and the at least one support surface may extend at least mainly parallel to one another. The longitudinal profile may be designed to accommodate further components. The longitudinal profile may be configured as a hollow profile.

The at least one stop area may have at least one fastening opening. At least one fastening element can be inserted into the longitudinal profile via the at least one fastening opening. The at least one fastening opening may be slit-shaped. The at least one fastening opening may preferably extend over the entire length of the longitudinal profile. The at least one fastening element may be inserted into the longitudinal profile via the at least one fastening opening. The at least one fastening opening may be formed between at least two projections pointing into the interior of the longitudinal profile. The two projections can engage with at least one fastening element. Such a fastening element may be designed so that it can engage behind the two projections to allow for the longitudinal profile to be attached to a transverse profile.

The at least one stop area may have at least one support portion. At least one support surface may be formed on the at least one support portion. Support portions, each having a support surface, may be provided on both sides of the fastening openings. The at least one head area may have at least one portion which mainly runs at right angles to one of the support portions. This portion may connect the respective support portion to the at least one connecting portion.

The at least one connecting portion may extend at an angle to the at least one support surface and/or the at least one bearing surface. The at least one longitudinal profile may have two connecting portions. The distance between the two connecting portions may change. Preferably, the distance between the connecting portions may decrease starting from the stop area in the direction of the head area. The distance may be the smallest at the transition to the engagement projections. In the area of the engagement projections, the cross section of the longitudinal profile increases again. The engagement projections may each have a nose or be designed in the form of a nose.

Furthermore, a connecting profile may be provided which is designed to connect at least two longitudinal profiles of the type described above. The connecting profile may be designed in such a way that the connecting element can be inserted into the longitudinal profiles to be connected in a form-fitting manner in order to establish a connection to these longitudinal profiles. This enables to produce a fastener-free connection between the connecting profile and the longitudinal profiles to be connected via the connecting profile. Accordingly, due to the connecting profile, no screws or similar elements are necessary to establish a connection between the connecting profile and the longitudinal profiles to be connected via the connecting profile. A suitable fit enables the connecting profile to be accommodated in the longitudinal profile.

The connecting profile may have at least one positioning element. Abutment of the longitudinal elements to be connected can be created via the at least one positioning element. This ensures that the longitudinal profiles assume their predetermined position on the connecting profile. The at least one positioning element may thus mark the center of the connecting profile.

The present invention further relates to a module clamp for fastening a module frame of a solar module to a longitudinal profile. The module clamp comprises a bracket-shaped body which has at least two arms which can engage with a head area of a longitudinal profile, at least one abutment element which is designed to bear against the module frame, and at least one connecting screw which connects the bracket-shaped body to the abutment element.

Each arm of the bracket-shaped body may have at least one projection pointing in the direction of the respective other arm. The projections may be designed to each engage behind one of the engagement projections of the longitudinal profile. For this purpose, each of the engagement projections of the longitudinal profile can have or form a nose which can be engaged from behind by one of the projections of the arms of the bracket-shaped body. With the at least one screw, a tensile force can be exerted on the bracket-shaped body when the bracket-shaped body engages with the engagement portion of the longitudinal profile and the abutment element abuts the module frame. With this tensile force, the bracket-shaped body can be stretched or lengthened so that the solar module can be fastened to the longitudinal profile.

The abutment element may have at least one abutment portion for abutment on the module frame and at least one support portion for supporting the bracket-shaped body. If the at least one abutment element abuts a module frame and the bracket-shaped body and the abutment element are braced against one another via the screw, the at least one abutment element can rest against the bracket-shaped body with its support portion. This prevents the abutment element from tilting. Tilting of the abutment element could result in the connection to the module frame becoming loose.

A transverse profile for connection to a longitudinal profile according to the invention may be provided. The transverse profile has at least one opening. The at least one opening has an insertion portion and a holding portion, the insertion portion and the holding portion having different cross sections. The at least one opening can be designed in the shape of a key. The insertion portion may have a larger cross section than the holding portion. With the opening, a fastener-free connection option with further elements may be provided. The transverse profile may have a mainly C-shaped cross section. The transverse profile may have two legs which run mainly parallel to one another and are connected to one another via a connecting leg. The at least one opening can be formed in the connecting leg. The insertion portion and the holding portion of the opening can adjoin one another in the longitudinal direction of the transverse element.

Furthermore, according to the invention, a connector for connecting a longitudinal profile and a transverse profile may be provided. The connector has at least one locking element which is configured for insertion into the insertion portion of the opening and for engaging behind the edges of the opening in the holding portion. This enables a connection that is easy to produce, does not require additional connecting means and can be secured by the weight of the solar modules and the longitudinal profiles.

A fastening system for fastening solar modules to a longitudinal profile is provided. The fastening system comprises at least one fastening profile which is designed to accommodate module frames of a solar module in sections, at least one clamping device that holds the at least one fastening profile on the longitudinal profile, and at least one fastening element that can engage with the fastening profile to hold the module frames of the solar modules on the fastening profile.

The fastening profile may have at least two receiving portions with which the at least one fastening element for fastening the module frame can engage. The at least one fastening element may have two legs whose ends point towards one another. With these ends, the legs can each engage in one of the receiving portions of the fastening profile. The solar modules can rest against one of the side surfaces of the fastening element's legs with their module frames. The fastening element may in particular be provided at one end of the fastening profile. The fastening profile can be fastened to the longitudinal profile via the at least one clamping device. The solar modules can be held on the fastening profile via the fastening elements.

The present invention further relates to a mounting system with one or more longitudinal profiles, one or more transverse profiles which are connected to the longitudinal profiles, and one or more posts which are connected to one or more transverse profiles. The transverse profile may be a transverse profile of the type described above.

The mounting system may in particular be designed for use as an outdoor mounting system. This means that the mounting system can be set up in open space.

The mounting system may have one or more connectors for connecting a longitudinal profile to a transverse profile. The mounting system may have at least one module clamp for fastening module frames to a longitudinal profile. The mounting system may have at least one fastening system for fastening module frames to a longitudinal profile.

The mounting system may have at least one inclination device for adjusting the inclination of the solar modules. The inclination device enables to incline the solar modules in the transverse direction in particular. The inclination device may be provided on at least one of the posts. The inclination device may have a stationary post portion and a pivotable inclination portion which is pivotable around a pivot point relative to the post portion. The stationary post portion may be connected to a post or be formed by a post. A grid of holes which interacts with at least one screw for adjusting the angle of inclination may be provided at the inclination portion. In addition or as an alternative, a slot which interacts with a screw for setting the angle of inclination may be provided. The slot may be formed by a series of bores, as is the case, for example, with water pump pliers. The slot may be curved. The inclination portion can be pivoted around a pivot point to adjust the angle of inclination. The adjusted angle of inclination can be fixed using the screw and the curved slot. The curved slot can specify the angular range in which the angle of inclination can be adjusted.

Figure 22:
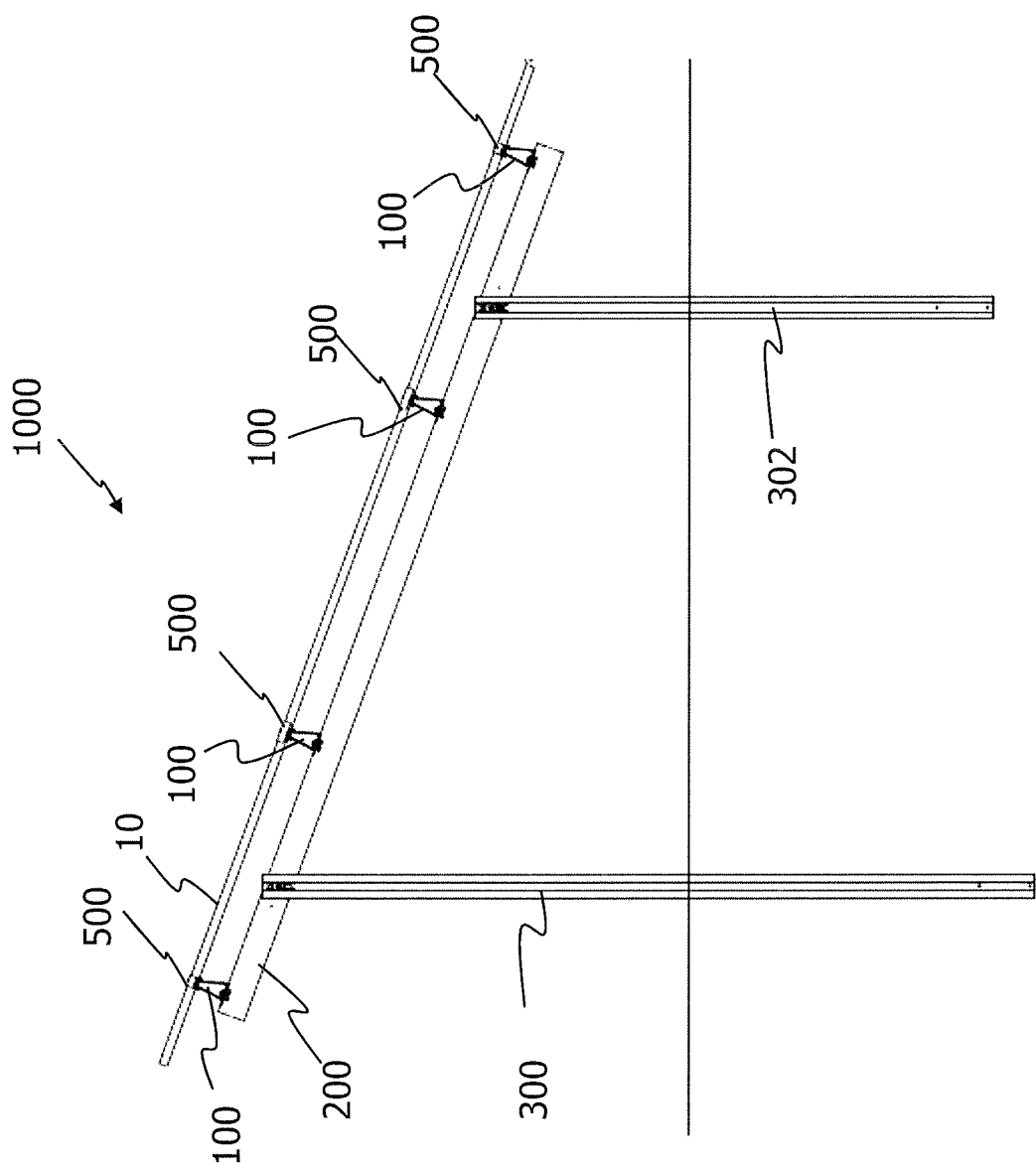
Figure 23:
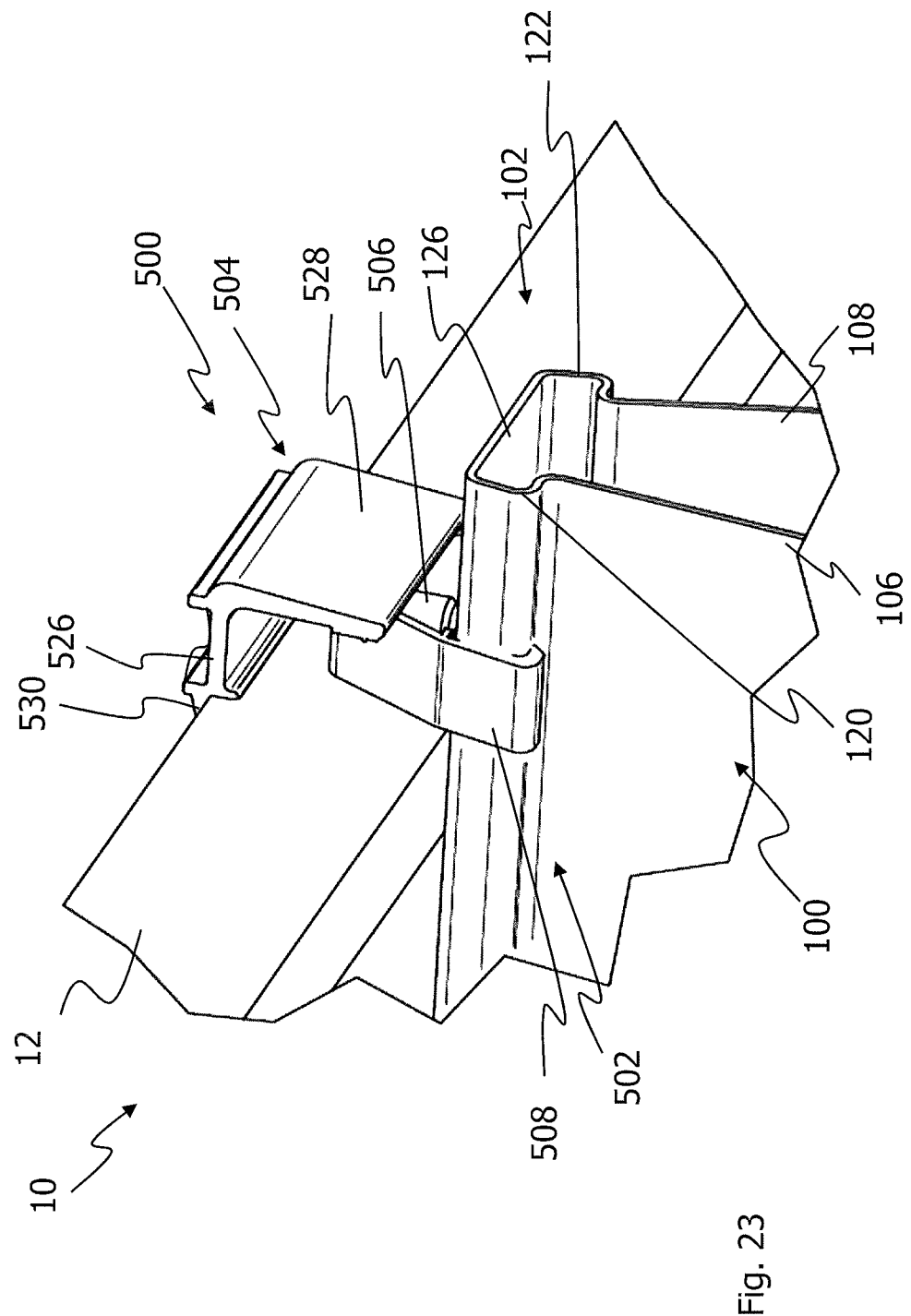
Figure 37:
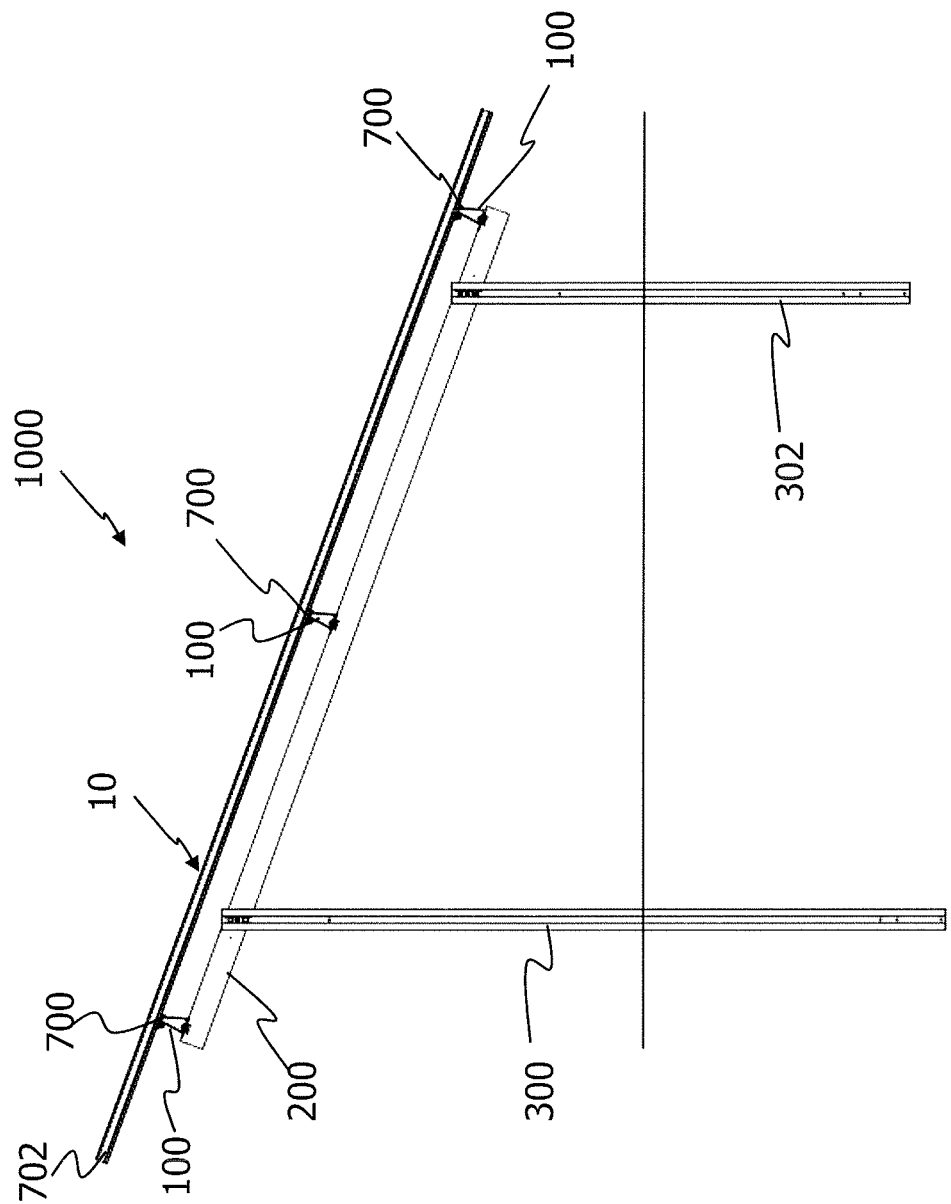
Figure 45:
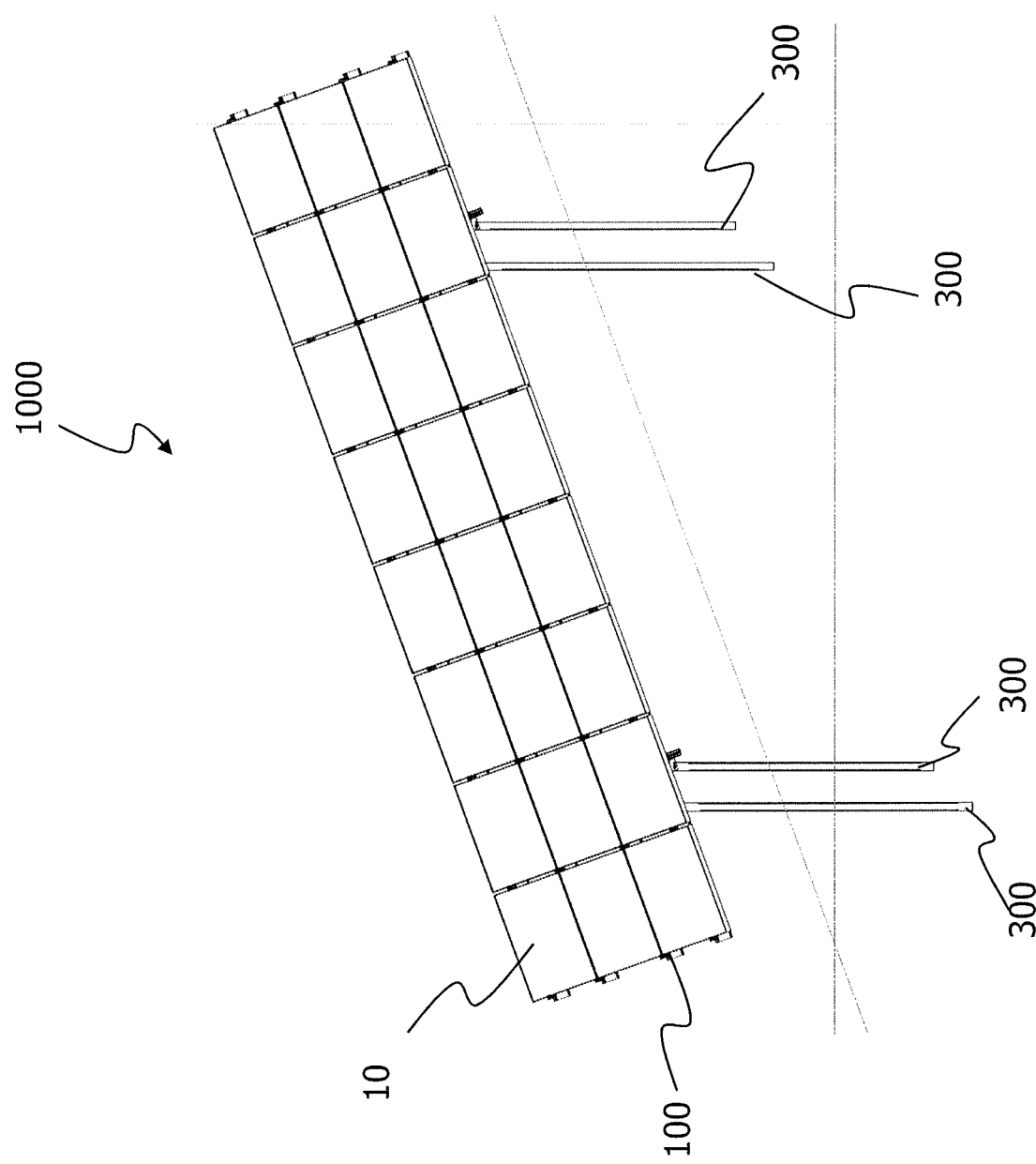
Figure 46:
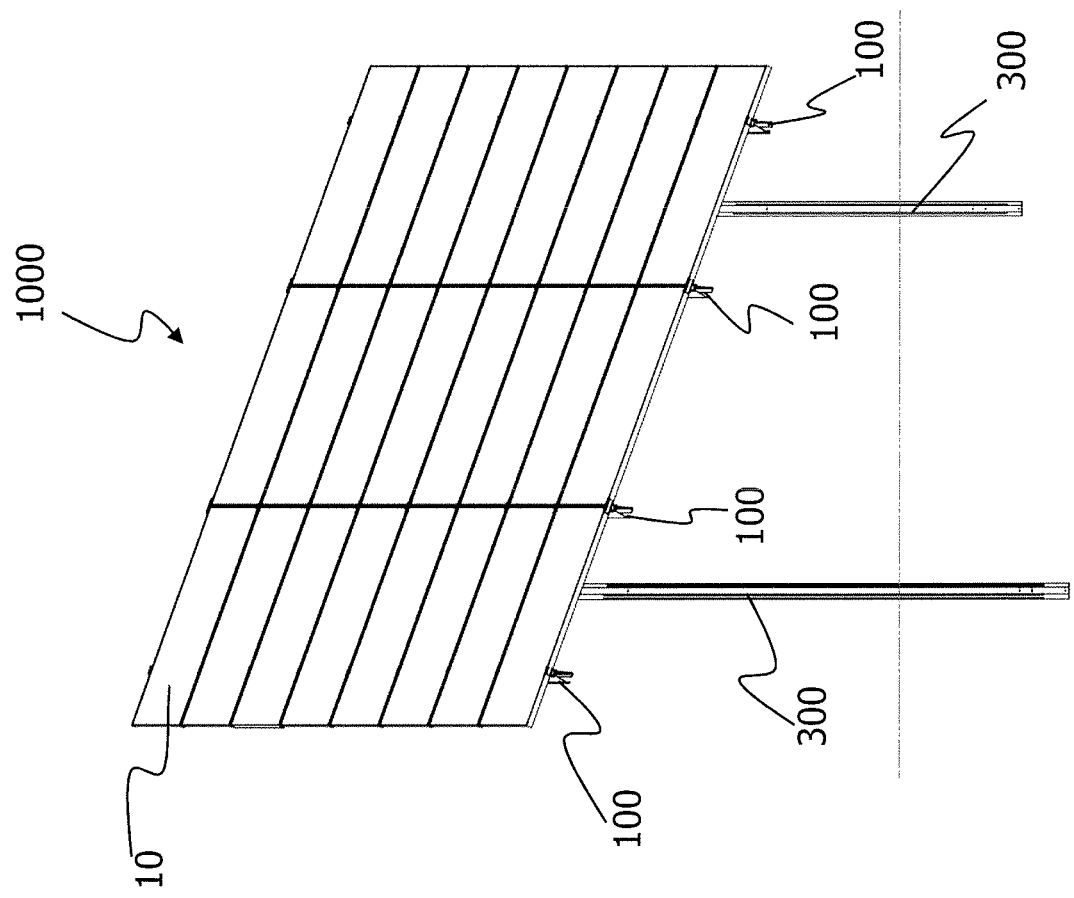

Exemplary embodiments are described below with reference to the attached figures. They represent:

FIGS. 1 to 3 perspective views of a mounting system for solar modules according to a first embodiment;

FIGS. 4 to 6 different views of a longitudinal profile of the mounting system according to FIGS. 1 to 3;

FIGS. 7 to 11 different views of a connecting element for connecting the longitudinal profile according to FIGS. 4 to 6;

FIGS. 12 to 16 different views of a module clamp according to a first embodiment for attaching solar modules to the longitudinal profiles according to FIGS. 4 to 6;

FIGS. 17 to 21 different views of a module clamp according to a second embodiment for attaching solar modules to the longitudinal profiles according to FIGS. 4 to 6;

FIG. 22 a side view of the mounting system according to FIGS. 1 to 3;

FIG. 23 a perspective view of the connection of a longitudinal profile according to FIGS. 4 to 6 with a module frame via a module clamp according to FIGS. 12 to 16;

FIG. 24 a view of the connection of a post with a transverse profile;

FIGS. 25 to 32 different views of the connection of a longitudinal profile according to FIGS. 4 to 6 with a transverse profile;

FIGS. 33 to 36 perspective views of a mounting system for solar modules according to a second embodiment;

FIG. 37 a side view of the mounting system according to FIGS. 33 to 36;

FIGS. 38 to 44 different views of a mounting system for fastening solar modules to a longitudinal profile according to FIGS. 4 to 6;

FIGS. 45 and 46 views of mounting systems according to a third embodiment, whose angle of inclination is adjustable; and FIGS. 47 to 52 different views of an inclination device.

FIGS. 1 to 3 show different perspective views of a mounting system 1000 for solar modules 10. In this embodiment of the mounting system 1000, the solar modules 10 are arranged vertically, i.e. in portrait format (see FIG. 1). The solar modules 10 have module frames 12.

The mounting system 1000 has longitudinal profiles 100, transverse profiles 200 and posts 300, 302. Each transverse profile 200 is connected to the two posts 300 and 302. The transverse profiles 200 carry the longitudinal profiles 100 to which the solar modules 10 are attached via their module frames 12. The posts 300 and 302 differ in length, with the posts 300 being longer than the posts 302. Due to the different lengths of the posts 300 and 302, the solar modules 10 are inclined.

FIGS. 4 to 6 show different views of a longitudinal profile 100. The longitudinal profiles 100 are often referred to as purlins. The longitudinal profile 100 has a head area 102 and a stop area 104. The head area 102 and the stop area 104 are connected to each other via connecting portions 106 and 108. The longitudinal profile 100 is fastened to the transverse profiles 200 via the stop area 104. The stop area 104 has a fastening opening 110 through which a fastening element (not shown) can be inserted into the longitudinal profile 100. The fastening opening 110 is slit-shaped and may extend over the entire length of the longitudinal profiles 100. The fastening opening 110 is set between two projections 112, 114 pointing into the interior of the longitudinal profile 100. A fastening element (not shown) may engage on the projections 112 and 114 to securely hold the longitudinal profiles 100 on the transverse profiles 200. The stop area 104 also has two support portions 116 and 118 which are provided on the side next to the fastening opening 110. The support portion 116 is longer than the support portion 118.

From the stop area 104, the connecting portions 106 and 108 extend towards the head area 102. The distance A between the connecting portions 106 and 108 decreases towards the head area 102. The smallest distance A between the connecting portions 106 and 108 is at or closely in front of the transition to the head area 102. In the head area 102, the cross section of the longitudinal profile 100 widens again via two engagement projections 120 and 122. The engagement projections 120 and 122 extend in the opposite direction. At the engagement projections 120, 122, a module clamp (not shown) may engage to enable the fastening of the solar modules 10 with their module frames 12 (not shown) to the longitudinal profiles 100.

The projections 120 and 122 are connected to each other via a bearing portion 124 which has a bearing surface 126 for the module frames 12 (not shown). The support portions 116 and 118 each have a support surface 128, 130. The support surfaces 128, 130 and the bearing surface 126 may extend mainly parallel to one another.

In addition, the stop area 104 has two portions 132 and 134 which extend between the support portions 116 and 118 and, in each case, one of the connecting portions 106 and 108. The portions 132 and 134 extend at an angle to the support portions 116 and 118. In particular, the portions 132 and 134 may extend at right angles to the support portions 116 and 118. The connecting portions 106 and 108 may in turn extend at an angle to the portions 132 and 134. The connecting portions 106 and 108 extend at an angle to the bearing surface and/or the support surfaces 128, 130. The angle of the connecting portion 106 to the bearing surface and/or the support surfaces 128, 130 is greater than the angle of the connecting portion 108 to the bearing surface and/or the support surfaces 128, 130. Due to the cross section described above, the longitudinal profile 100 has a high strength and is inexpensive to manufacture, nevertheless.

FIGS. 7 to 11 show different views of a connecting profile 400 which is used to connect two longitudinal profiles 100. The cross section of the connecting profile 400 is matched to the cross section of the longitudinal profiles 100. The connecting profile 400 can for example be accommodated and held in sections in the respective longitudinal profile by means of a suitable fit. The connecting profile 400 is designed in such a way that the longitudinal profiles to be connected 100 can be connected to each other without additional fasteners. The connecting profile 400 has two support portions 402 and 404 between which an opening 406 is defined. The support portion 404 has a folding. The two support portions 402 and 404 allow the connecting profile 400 to support against the support portions 116 and 118 of the longitudinal profiles 100 (see FIGS. 4 to 6). The connecting profile 400 further comprises two lateral abutment portions 408 and 410 which are connected to each other via an abutment portion 412. The lateral abutment portions 408 and 410 are connected to each other via portions 414 and 416 that extend parallel to each other. The support portions 402 and 404 and the abutment portions 408, 410 and 412 abut the corresponding inner surfaces of the longitudinal profiles 100 with their outer surfaces, at least in sections, in order to thus establish a connection to the longitudinal profiles.

The connecting profile 400 has a positioning element 418 that is used to position the connecting profile 400 on the longitudinal profiles 100 to be connected. The positioning element 418 is formed centrally on the portion 416 and protrudes beyond the support portion 404. The positioning element 418 thus constitutes a projection. Unlike the support portion 404, the positioning element 418 is not folded. FIG. 11 shows a detailed view of detail X in FIG. 8 in which the positioning element 418 is shown.

FIGS. 12 to 16 show different views of a module clamp 500 according to a first embodiment. The module clamp 500 has a bracket-shaped body 502, an abutment element 504, and a screw 506. The bracket-shaped body 502 has two arms 508 and 510 which are connected to each other via a connecting portion 512. An opening 514 is formed in the connecting portion 512 for receiving the screw 506. The opening 514 has an internal thread into which the screw 506 can be screwed. The two arms 508 and 510 each have two projections 516, 518, 520 and 522. The projections 516, 518, 520 and 522 are provided on the inside of the arms 508 and 510. The projections 516, 518, 520 and 522 thus each point in the direction of the respective other arm 508, 510.

The abutment element 504 has an angled basic shape. A receptacle 524 for accommodating the head of the screw 506 is formed on the abutment element 504. The abutment element 504 further has an abutment portion 526 and a support portion 528. The abutment portion 526 and the support portion 528 extend at an angle to each other. The abutment portion 526 has an abutment surface 530 for abutment against a module frame that is not shown. A support surface 532 is formed on the support portion 528 for supporting the abutment element against the bracket-shaped body 502, as shown in FIG. 15. The abutment element 504 is designed to be attached to one end of a solar module assembly, i.e. the abutment element 504 abuts only at one module frame. The abutment element 504 may be used to attach a module frame of a solar module to a longitudinal profile 100.

FIGS. 17 to 21 show different views of a module clamp 500 according to a second embodiment. The module clamp 500 has the bracket-shaped body 502 and an abutment element 534 which is connected to the bracket-shaped body 502 via the screw 506. The bracket-shaped body 502 is identical to the bracket-shaped body 502 described with reference to FIGS. 12 to 16. According to this embodiment, the abutment element 534 is configured to abut two adjacent module frames. For this purpose, the abutment element 534 has two abutment portions 536 and 538, each having an abutment surface 540 and 542. Furthermore, the support portions 544 and 546 are formed on the abutment element 534, between which the screw 506 extends. The abutment element 534 can be supported on the bracket-shaped body 502 via the support portions 544 and 546 which extend at an angle to the abutment portions 536 and 538. Each of the two abutment portions 536 and 538 can be used to clamp a module frame (not shown) against a longitudinal profile 100 via the bracket-shaped body 502 and the screw 506.

FIG. 22 shows a side view of a mounting system 1000 for solar modules 10. The mounting system 1000 is fixed in or on the ground by the posts 300 and 302. The posts 300 and 302 are connected to a transverse profile 200. Two or more longitudinal profiles 100 may be provided. The number of longitudinal profiles 100 depends on the applied loads and the number of module rows. In the embodiment shown in FIG. 22, the transverse profile 200 supports four longitudinal profiles 100. The module clamps 500 fasten the solar modules 10 to the longitudinal profiles.

FIG. 23 shows a view in which a module frame 12, a module clamp 500 and a longitudinal profile 100 are shown. The bottom of the module frame 12 rests on the bearing surface 126 of the head area 104 of the longitudinal profile 100. With its arms 508, 510 (only arm 508 is shown), the bracket-shaped body 502 of the module clamp 500 engages with the engagement projections 120 and 122 of the longitudinal profile 100. The abutment portion 526 of the abutment element 504 rests on the top of the module frame 12. The screw 506 allows the bracket-shaped body 502 and the abutment element 504 to be braced against each other to clamp the module frame 12 against the longitudinal profile 100. The screw 506 applies a tensile force to the bracket-shaped body 502, stretching the bracket-shaped body 502 to keep it engaged with the engagement projections 120, 122 of the head area 102 of the longitudinal profile 100. The support portion 528 of the abutment element 526 bears against the bracket-shaped body 502. The module clamp 500 according to FIG. 23 is a module clamp for attachment to an end of a solar module assembly, i.e. it is an end clamp.

FIG. 24 shows an enlarged portion of the connection point between one of the posts 300, 302 and the transverse profile 200. The posts have a mainly C-shaped profile. A slot 304 is formed on the posts 300, 302 into which a screw 306 can be inserted to connect the post 300, 302 to the transverse profile 200. Next to the slot 304, several smaller openings 308 are identifiable which can engage with an intermediate element 310. For this purpose, the intermediate element 310 has projections which are formed to correspond to the openings 308 and can engage therein. Via the slot 304 and the openings 308, the intermediate element 310 can be used to set or finely adjust the height of the transverse profile 200 relative to the ground.

FIG. 25 shows an enlarged portion of FIG. 22 showing the connection between the module frame 12, the longitudinal profile 100 and the transverse profile 200 via the module clamp 500. The connecting profile 400 can be seen within the longitudinal profile 100. The connecting profile 400 abuts the longitudinal profiles 100 with the outer surfaces of its abutment portions 402, 406, 408 and 410. The connecting profile 400 may be accommodated in the longitudinal profile 100 via an interference fit. In particular with its portions 402 and 404, the connecting profile 400 is based on the support portions 116 and 118 of the longitudinal profile 100. The portion 410 of the connecting profile 400 abuts the inner surface of the bearing portion 124 of the longitudinal profile 100.

The module frame 12 rests on the bearing surface 126 of the longitudinal profile 100. The module frame 12 is fastened to the longitudinal profile 100 with the module clamp 500, of which only the arms 508 and 510 of the bracket-shaped body 502 and parts of the screw 506 are shown in FIG. 23. For this purpose, in particular with their projections 518 and 520, the arms 508 and 510 engage at the engagement projections 120 and 122 of the head area 102 of the longitudinal profile 100. The projections 518 and 520 on the arms 508 and 510 are configured to engage behind the engagement projections 120 and 122. The engagement projections 120, 122 have a nose or are formed in sections in the shape of a nose behind which the projections 518 and 520 at the end of the arms 508 and 510 can engage. A tensile force is exerted on the arms 508 and 510 of the bracket-shaped body 502 by the screw 506, visible in sections, of the module clamp 500, through which the module frame 512 can be braced against the longitudinal profile 100.

At its stop area 104, the longitudinal profile 100 is fastened to the transverse profile 200. With its support portions 116 and 118, the longitudinal profile 100 rests against the transverse profile 200. A connector 600 is provided on the transverse profile 200, which connects the transverse profile 200 and the longitudinal profile 100 via a fastening element 602 and a screw 604. The fastening element 602 can be inserted into the longitudinal profile 100 through the opening 110. The fastening element 602 engages with the projections 112 and 114 of the longitudinal profile 100. In other words, the fastening element 602 can accommodate the projections 112 and 114 in sections. The fastening element 602 includes engagement portions 606 and 608 that engage around or behind the projections 112 and 114 of the fastening element. The support portion 404 of the connecting profile 400, which includes a fold, abuts the engagement portion 608 with its folded portion. Thus, the support portion 404 abuts the longitudinal profile 100 and the engagement portion 608 of the fastening element 602.

FIGS. 26 to 32 show several views of the connection of the longitudinal profile 100 to the transverse profile 200 via the connectors 600. The transverse profile 200 has a mainly C-shaped cross section. Accordingly, the cross section of the transverse profile 200 has two mainly parallel legs 202, 204 that are connected to each other via a connecting leg 206. The longitudinal profile 100 rests on the leg 202. The connector 600 contacts both the longitudinal profile 100 and the transverse profile 200. For this purpose, the connector 600 has an abutment portion 610 and a bearing portion 612. The connector 600 abuts the leg 206 of the transverse profile 200 with the abutment portion 610 and is connected to this transverse profile 200 via the abutment portion 610. The longitudinal profile 100 rests on the bearing portion 612. The connector 600 is connected to the longitudinal profile 100 via the screw 604. The connector 600 also has two stiffening portions 614 which extend between the abutment portion 610 and the bearing portion 612.

Figure 26:
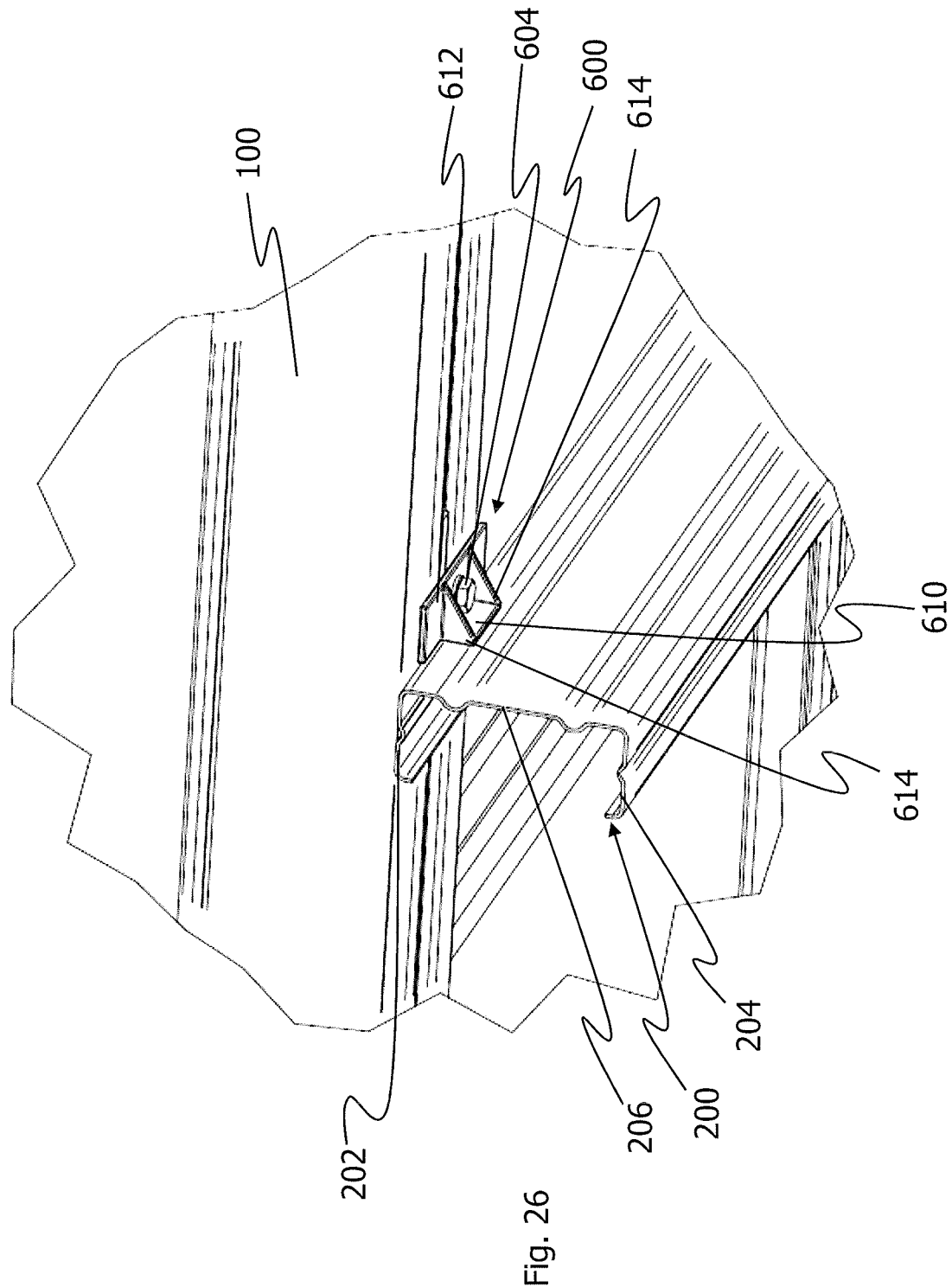
Figure 28:
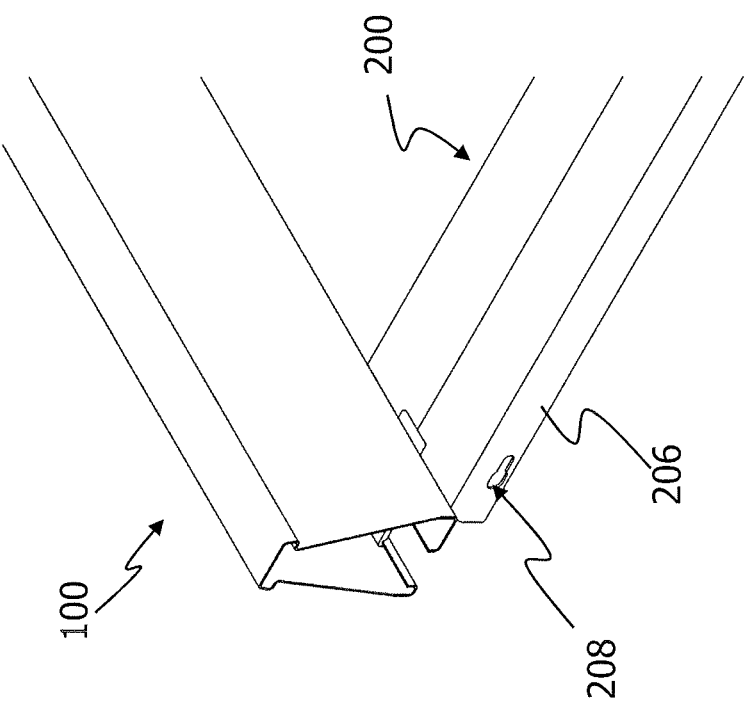
Figure 27:
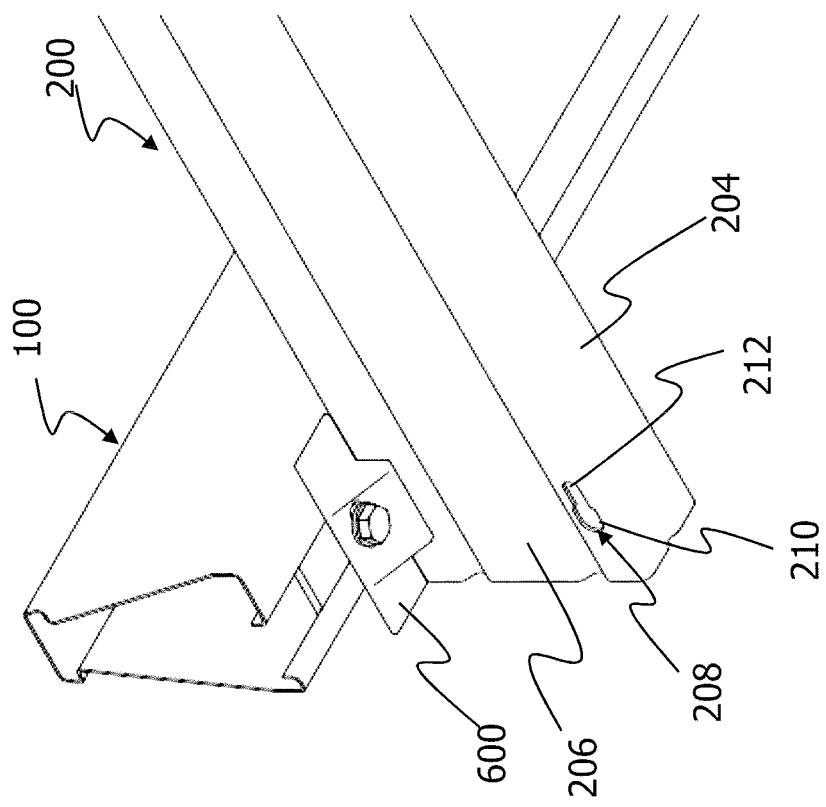
Figure 31:
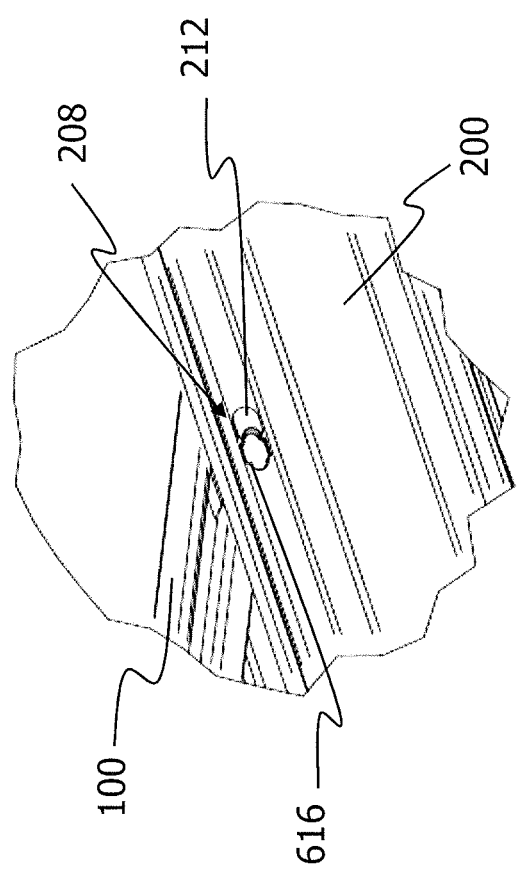

The transverse profile 200 has one or more openings 208 (see FIGS. 26, 27 and 29). The openings 208 are key-shaped. The connector 600 can be attached to the transverse profiles 200 via the openings 208. The openings 208 have an insertion portion 210 with a larger cross section and a holding portion 212 with a smaller cross section. A locking element 616 of the connector 600 can be inserted into the insertion portion 210 (see FIGS. 28 and 30). The connector 600 is then displaced toward the holding portion 212 of the opening 208 so that the locking element 616 of the connector 600 can engage behind the edges of the holding portion 212 of the opening 208. In other words, the locking element 616 has a head that can engage behind the edges of the opening 208. For this purpose, the connecting element 616 may have, for example, a T-shaped cross section. By appropriately arranging the transverse profiles 200 at an angle of inclination, the connector 600, together with the longitudinal profiles 100 attached thereto, can be held in the holding portion 212 of the opening 208 of the transverse profile 200 mostly by gravity. This is shown, for example, in FIG. 30. No other fasteners are required to fasten the connector 600 to the transverse profile 200.

Figure 32:
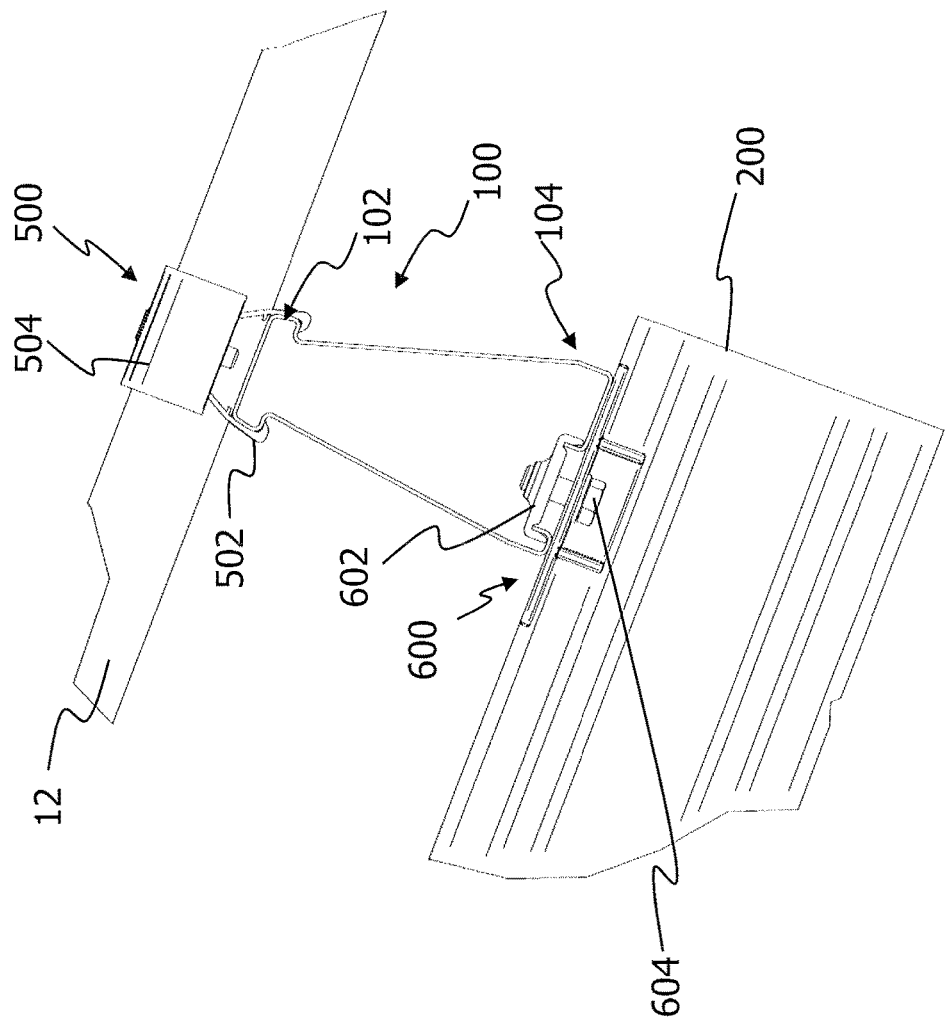
Figure 33:
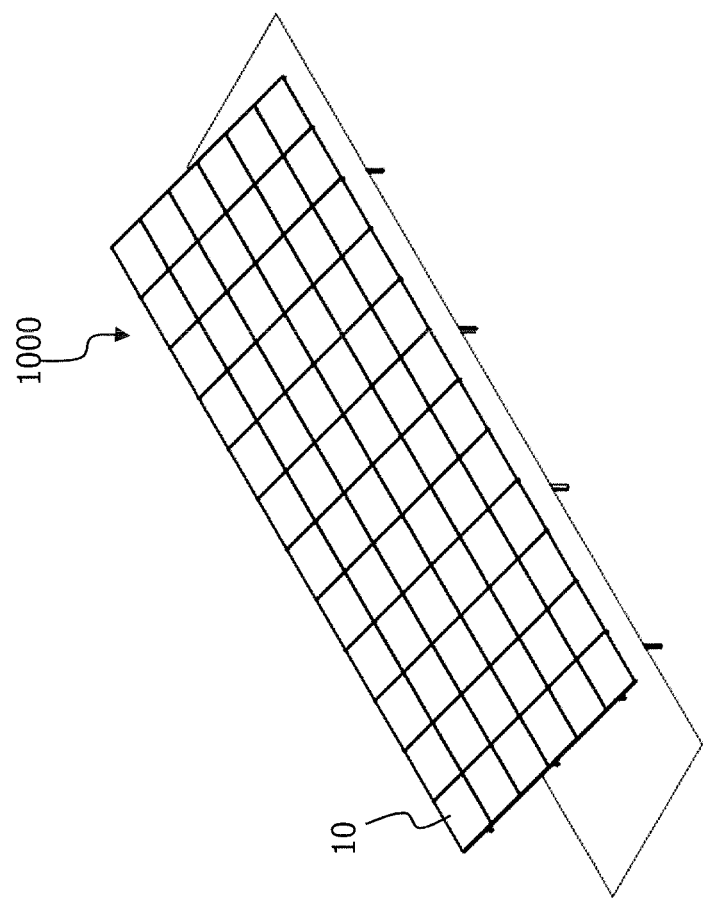
Figure 36:
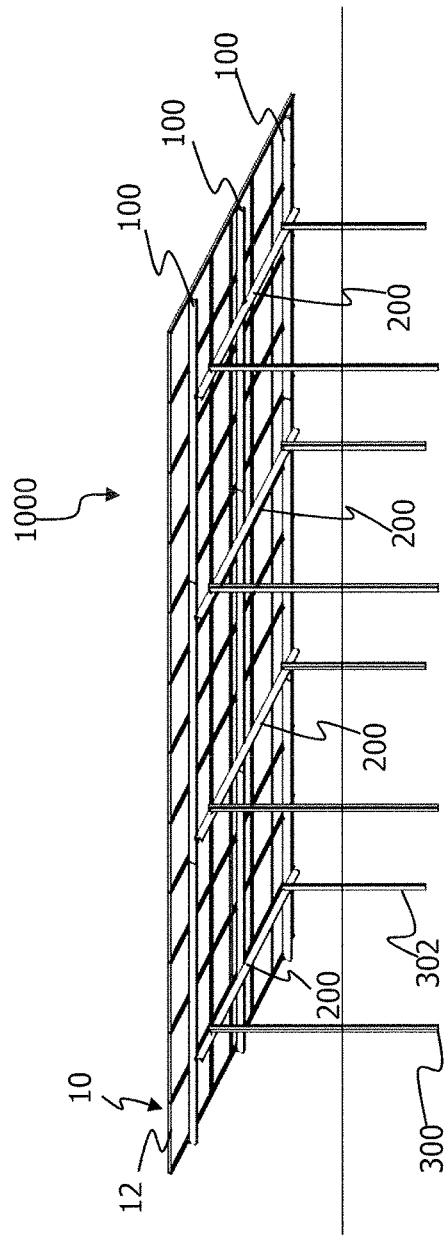
Figure 35:
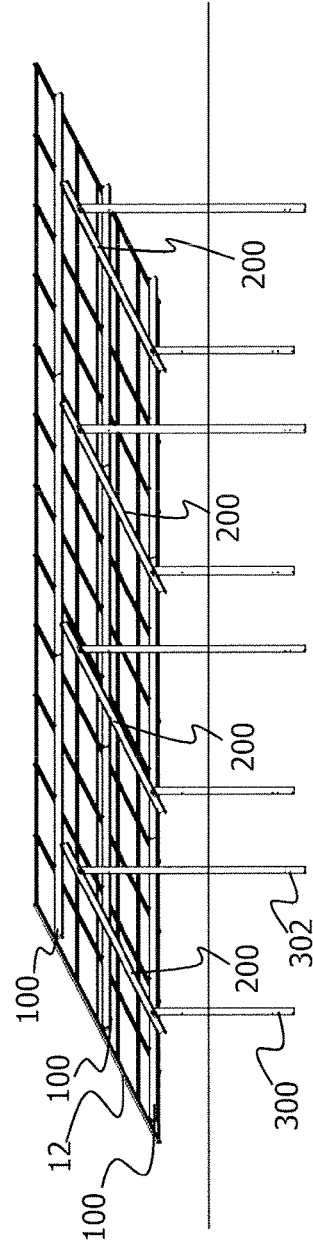
Figure 34:
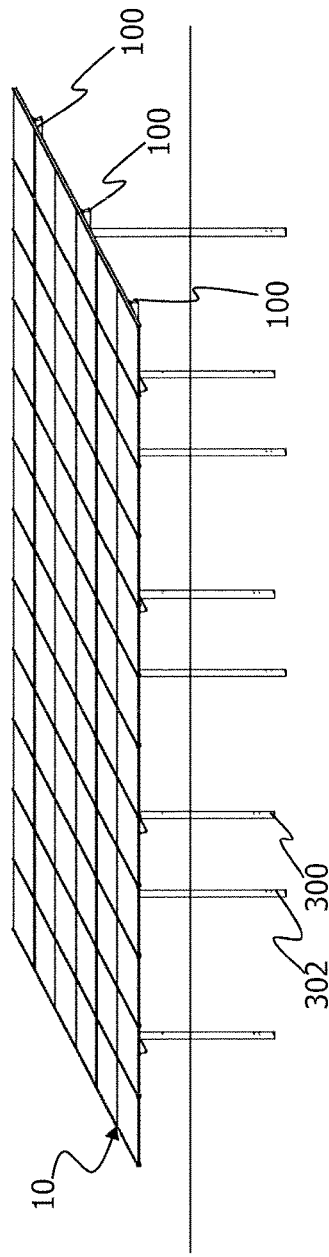

In FIG. 32, the module frame 12 is attached to the longitudinal profile 100 via the module clamp 500. For this purpose, the bracket-shaped body 502 engages with the drive portion 102 of the longitudinal profile 100. The stop area 104 of the longitudinal profile 100 rests against the transverse profile 200. The longitudinal profile 100 is connected to the transverse profile 200 via a connector 600. To provide a connection between the longitudinal profile 100 and the transverse profile 200, the connector 600 has a fastening element 602 and a screw 604. The fastening element 602 can be inserted into the longitudinal profile 100 and be engaged with the stop area 104 of the longitudinal profile 100. The main difference between FIGS. 25 and 32 is that no connecting profile 400 is provided according to FIG. 32, i.e. FIG. 32 shows a portion of the longitudinal profile 100 in which no connection to another longitudinal profile 100 needs to be made.

FIGS. 33 to 36 show different perspective views of a mounting system 1000 for solar modules 10 according to a second embodiment. In this embodiment of the mounting system 1000, the solar modules 10 are arranged horizontally, i.e. in landscape format (see FIG. 33). The solar modules 10 have module frames 12.

The mounting system 1000 shown in FIGS. 33 to 36 has longitudinal profiles 100, transverse profiles 200 and posts 300, 302, too. Each transverse profile 200 is connected to the two posts 300 and 302. Two or more longitudinal profiles 100 may be provided. Unlike the embodiment described with reference to FIGS. 1 to 4, only three longitudinal profiles 100 are provided in the mounting system according to FIGS. 33 to 36. With this arrangement of the solar modules, the number of longitudinal profiles 100 may depend on the loads applied.

FIG. 37 shows a side view of the mounting system 1000. FIG. 37 already clearly shows that, unlike in the first embodiment, no module clamps engage on the outer module frame 10. According to this embodiment, a clamping device 700 and fastening profiles 702 are provided for fastening the solar modules 10 to the transverse profiles 100. The clamping devices 700, shown in FIG. 37 in rudimentary form only, engage on the fastening profile 702 and the longitudinal profiles 100.

Figure 38:
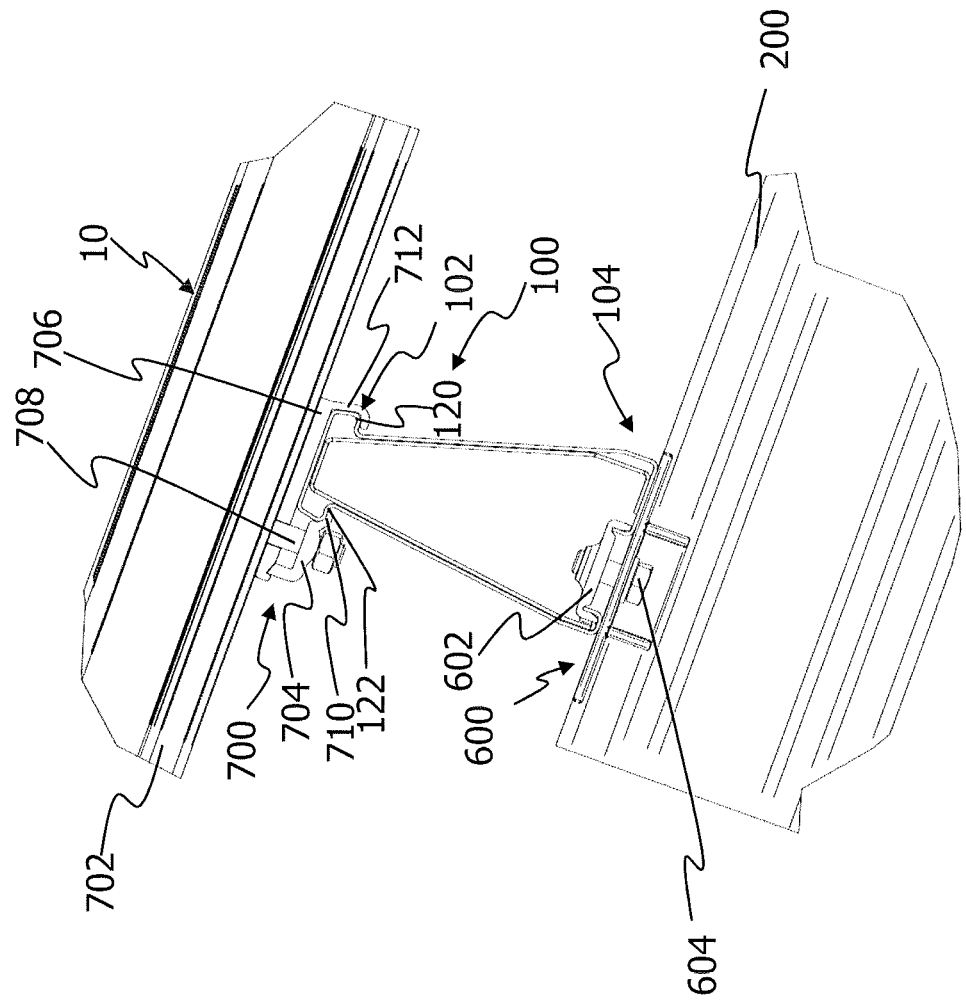

FIG. 38 shows an enlarged portion of the connection of the solar modules 10 to the longitudinal profiles 100. The clamping device 700 has a clamping element 704, a base element 706 and a screw 708. The clamping element 704 has a clamping portion 710 that is arched or curved. The clamping portion 710 can engage with the drive portion 122 of the longitudinal profile 100. The base element 706 has a holding portion 712 that at least partially accommodates the engagement projection 120. The clamping element 704 can be braced against the base element 706 with the screw 708, thereby clamping the fastening profile 702 to the longitudinal profile 100. A nut is provided on the screw 708 for clamping the longitudinal profile 100. A shear bolt may replace the screw 708 along with the nut.

FIGS. 39 to 41 show different views of the fastening profile 702 and the clamping device 700 when attached to a longitudinal profile 100. The clamping device 700 has the clamping element 704, the base element 706, and the screw 708 that secures the clamping element 704 to the base element 706. The clamping element 704 can clamp the longitudinal profile 100 against the base element 706. A projection 714 is formed on the base element 706, which protrudes from the base element 706 in a direction opposite to the holding portion 712. The projection 714 may have a T-shaped cross section. The projection 714 may engage with a fastening rail 716 of the fastening profile 702. The fastening rail 716 rests on the base element 706 of the clamping device 700 at least in sections. The head of the screw 708 (not shown) is also located in the fastening rail 716 in order to achieve a clamping effect between the fastening profile 702 and the longitudinal profile 100 by tightening the nut on the screw 708. In addition, the fastening profile 702 has two receiving portions 718 and 720, each of which is configured to accommodate a solar module frame.

FIGS. 42, 43 and 44 show a fastening element 724 when attached to the fastening profile 702. Using the fastening element 724, module frames (not shown) can be fastened to the fastening profile 702. The fastening profile 702 is in turn attached to the longitudinal profiles 100 via the clamping device 700 (see FIGS. 39 to 41). The fastening element 724 has a fastening portion 726 and two legs 728 and 730. The legs 728 and 730 are bent inward, i.e. toward each other, at their ends 732 and 734. In addition, the fastener 724 has a screw 736 that extends through the fastener portion 726. The screw 736 has a head 738 that is accommodated in or inserted into the fastening rail 716. In addition, a nut is provided on the screw 736, which is provided for clamping the fastening element 724 to the fastening profile 702. The two inwardly curved ends 732 and 734 of the legs 728 and 730 engage with the receiving areas 718 and 720 of the fastening profile 702. This allows the module frames to abut on one of the side surfaces of the legs 728 and 730 and thus to be secured to the fastening profile. The fastening element 724 can be attached to the fastening profile 702 and moved along the fastening profile 702. Once the fastening element 724 has reached the desired position, the nut is tightened and the fastening element 724 is secured to the fastening profile 702. Preferably, the fastening element 724 can be attached to one end of the fastening profile 702 to be able to hold or support the modules.

FIGS. 45 and 46 show further embodiments of mounting systems 1000 that can be inclined in the transverse direction depending on the terrain. For this purpose, the posts may be provided with inclination devices 800 or may be configured as inclination devices 800. The mounting systems 1000 each have posts 300 that have an inclination device 800.

The inclination device 800 shown in FIGS. 47 to 52 has a stationary post portion 802 that may be formed by one of the posts 300, 302. A pivotable inclination portion 804 is disposed on the stationary post portion 802. Openings 806 to which a transverse profile 200 can be attached are formed on the inclination portion 804. The screw 808 connecting the stationary post portion 802 and the inclination portion 804 forms the pivot point around which the inclination portion 804 can be pivoted. In addition, a curved slot 810 is formed on the inclination portion 804 to interact with a screw 812 for adjusting the inclination angle. The adjusted inclination angle can be fixed by the screw 812. The extension of the curved slot 810 provides an inclination angle range for the inclination angle which can be adjusted through the inclination device 800. The curved slot may be formed by a series of bores.

FIG. 52 shows the inclination device 800 with a transverse profile 200 attached thereto. The transverse profile 200 is attached to the inclination portion 804 via the screw 814. The screw 808 forms the pivot point around which the inclination portion 804 can be pivoted. The screw 812 serves to fix the inclination angle, which is set once.

The invention claimed is:

1. A system for mounting a solar module comprising:
   a longitudinal profile comprising:
      at least one stop area which is designed to fasten the longitudinal profile to a transverse profile, wherein the at least one stop area has at least one support surface for support on the transverse profile;
      at least one head area which is connected to the at least one stop area via at least one connecting portion, wherein the at least one head area has at least one bearing surface for at least one portion of a module frame of the solar module, wherein the at least one head area has at least two engagement projections which is are configured as points of engagement for a fastening device;
      wherein the at least two engagement projections are pointing in opposite directions away from each other, wherein the longitudinal profile has at least two connecting portions, wherein the distance between the connecting portions decreases starting from the stop area in the direction of the head area; and
      wherein the at least two engagement portions extend at differing angles from the at least one head area to the at least one stop area.

2. The system according to claim 1 wherein the head area has at least one bearing portion which connects the at least two engagement projections, wherein the bearing portion comprises the at least one bearing surface.

3. The system according to claim 1 wherein the at least one fastening opening is defined between at least two projections which point into the interior of the longitudinal profile and which can engage with at least one fastening element.

4. The system according to claim 1 wherein the at least one stop area has at least one support portion on which the at least one support surface is formed.

5. The system according to claim 4 further comprising a connecting profile configured to connect at least two longitudinal profiles, wherein the connecting profile is designed so that the connecting profile can be inserted into the longitudinal profiles to be connected in a form-fitting manner.

6. The system according to claim 1 wherein the at least one connecting portion extends at an angle to the at least one support surface and/or the at least one bearing surface.

7. The system according to claim 5 wherein the connecting profile has at least one positioning element.

8. The system according to claim 1 further comprising:
   a module clamp for fastening the solar module to the longitudinal profile, the module clamp comprising:
      a bracket-shaped body with at least two arms configured to engage with the head area of the longitudinal profile,
      an abutment element configured for abutment on the module frame, and
      at least one screw which connects the bracket-shaped body to the abutment element.

9. The system according to claim 8 wherein each arm of the bracket-shaped body has at least one projection pointing in the direction of another arm of the at least two arms.

10. The system according to claim 8 wherein the abutment element has at least one abutment portion for abutment on the module frame and at least one support portion for support on the bracket-shaped body.

11. The system according to claim 1 wherein the transverse profile has at least one opening which has an insertion portion and a holding portion, the insertion portion and the holding portion having different cross sections.

12. The system according to claim 11 further comprising a connector configured to connect the longitudinal profile to the transverse profile, wherein the connector has at least one locking element which is designed for insertion into the insertion portion of the opening and for engaging behind edges of the opening in the holding portion.

13. The system according to claim 1 further comprising:
   a fastening system comprising:
      at least one fastening profile which is designed to accommodate at least one module frame of the solar module in sections,
      at least one clamping device which holds the at least one fastening profile on the longitudinal profile, and
      at least one fastening element which can engage with the fastening profile in order to hold the module frames on the fastening profile.

14. The system according to claim 13 wherein the fastening profile has at least two receiving portions with which the at least one fastening element for fastening the solar module engages.

15. The system according to claim 1 further comprising one or more of the longitudinal profile is connected to one or more of the transverse profile, and one or more of the transverse profile is connected to a plurality of posts.

16. The system according to claim 15 further comprising at least one inclination device for adjusting the inclination of the solar module.

17. The system according to claim 16, wherein the inclination device has a stationary post portion and a pivotable inclination portion which is pivotable around a pivot point relative to the post portion.

18. The system according to claim 1 wherein the distance between the two connecting portions of the longitudinal profile is smallest at the transition to the head area, wherein the cross section of the longitudinal profile widens again in the head region by means of the engaging projections.

19. A module clamp configured to fasten a solar module to a longitudinal profile, the longitudinal profile comprising:
   at least one stop area which is designed to fasten the longitudinal profile to a transverse profile, wherein the at least one stop area has at least one support surface for support on the transverse profile;
   at least one head area which is connected to the at least one stop area via at least one connecting portion, wherein the at least one head area has at least one bearing surface for at least one portion of a module frame of the solar module, wherein the at least one head area has at least two engagement projections which are configured as points of engagement for a fastening device; and wherein the at least two engagement projections are pointing in opposite directions away from each other, wherein the longitudinal profile has at least two connecting portions, wherein the distance between the connecting portions decreases starting from the stop area in the direction of the head area;

wherein the at least two engagement portions extend at differing angles from the at least one head area to the at least one stop area;

the module clamp comprising:
- a bracket-shaped body with at least two arms configured to engage with the head area of the longitudinal profile;
- an abutment element configured for abutment on a module frame; and
- at least one screw which connects the bracket-shaped body to the abutment element.

20. A system for mounting a solar module comprising:

a longitudinal profile comprising:
- at least one stop area comprising at least one support surface and at least one head area, wherein the at least one head area has at least two engagement projections pointing in opposite directions away from each other, wherein the longitudinal profile has at least two connecting portions, wherein the distance between the connecting portions decreases starting from the stop area in the direction of the head area;

a module clamp for fastening the solar module to the longitudinal profile;

a transverse profile configured to connect to the longitudinal profile and a plurality of posts; and wherein the at least two engagement portions extend at differing angles from the head area to the stop area.

* * * * *